US012670603B2

(12) United States Patent
Figueroa-Alvarez et al.

(10) Patent No.: US 12,670,603 B2
(45) Date of Patent: Jun. 30, 2026

(54) ANATOMICAL AND FUNCTIONAL ASSESSMENT OF CORONARY ARTERY DISEASE USING MACHINE LEARNING

(71) Applicants: REGENTS OF THE UNIVERSITY OF MICHIGAN, Ann Arbor, MI (US); AngioInsight, Inc., Minnetonka, MN (US)

(72) Inventors: Carlos Alberto Figueroa-Alvarez, Ann Arbor, MI (US); Brahmajee Kartik Nallamothu, Ann Arbor, MI (US); Ismael Assi, Toledo, OH (US); Haizhou Yang, Ann Arbor, MI (US); Kritika Iyer, Ann Arbor, MI (US); Raj Rao Nadakuditi, Ann Arbor, MI (US); Krishnakumar Garikipati, Ann Arbor, MI (US); Elizabeth Renee Livingston, Ann Arbor, MI (US); Yang Zhou, Ann Arbor, MI (US)

(73) Assignees: REGENTS OF THE UNIVERSITY OF MICHIGAN, Ann Arbor, MI (US); AngioInsight, Inc., Minnetonka, MN (US)

( * ) Notice: Subject to any disclaimer, the term of this patent is extended or adjusted under 35 U.S.C. 154(b) by 287 days.

(21) Appl. No.: 18/225,363

(22) Filed: Jul. 24, 2023

(65) Prior Publication Data

US 2023/0368398 A1 Nov. 16, 2023

Related U.S. Application Data

(63) Continuation-in-part of application No. 17/861,100, filed on Jul. 8, 2022, now Pat. No. 11,861,851, which
(Continued)

(51) Int. Cl.
*G06K 9/00* (2022.01)
*G06N 3/084* (2023.01)
(Continued)

(52) U.S. Cl.
CPC ............. *G06T 7/215* (2017.01); *G06N 3/084* (2013.01); *G06T 5/70* (2024.01); *G06T 7/277* (2017.01);
(Continued)

(58) Field of Classification Search
CPC ..... A61B 8/0891; A61B 8/0883; A61B 6/504; A61B 5/489; A61B 5/7485;
(Continued)

(56) References Cited

U.S. PATENT DOCUMENTS 8,406,860 B2    3/2013   Dvorsky et al.
8,831,304 B2    9/2014   Xu et al.
(Continued)

FOREIGN PATENT DOCUMENTS

CN      108665449 A     10/2018
CN      113628193 A     11/2021
(Continued)

OTHER PUBLICATIONS

Au, Benjamin; Shaham, Uri; Dhruva, Sanket; Automated Characterization of Stenosis in Invasive Coronary Angiography Images with Convolutional Neural Networks; ARXIV ID: 1807.10597; Publication Date: Jul. 19, 2018 (Year: 2018).*
(Continued)

*Primary Examiner* — Atiba O Fitzpatrick

(57) ABSTRACT

Anatomical and functional assessment of coronary artery disease (CAD) using machine learning and computational modeling techniques deploying methodologies for non-invasive Fractional Flow Reserve (FFR) quantification based on angiographically derived anatomy and hemodynamics
(Continued)

data, relying on machine learning algorithms for image segmentation and flow assessment, and relying on accurate physics-based computational fluid dynamics (CFD) simulation for computation of the FFR.

35 Claims, 29 Drawing Sheets

Related U.S. Application Data is a continuation of application No. 17/101,550, filed on Nov. 23, 2020, now Pat. No. 11,386,563.

(60) Provisional application No. 62/939,370, filed on Nov. 22, 2019.

(51) Int. Cl.

| | |
|---|---|
| *G06T 5/70* | (2024.01) |
| *G06T 7/215* | (2017.01) |
| *G06T 7/277* | (2017.01) |

(52) U.S. Cl.
CPC .............. *G06T 2207/10072* (2013.01); *G06T 2207/20081* (2013.01); *G06T 2207/20084* (2013.01); *G06T 2207/30104* (2013.01)

(58) Field of Classification Search
CPC .... G01N 2800/323; G06T 2207/30104; G06T 2207/30048; G06T 2207/30101; G06T 2211/404; G06T 3/4038; G06T 2207/20212; G06T 2207/20221; G06T 2207/20044; G06T 3/0037; G06T 2207/20081; G06T 2207/20084; G06T 7/10–194; G06T 2207/20021; G06T 2207/20112–20168; G01R 33/5635; G06V 10/16; G06V 10/70; G06V 10/82; G06V 10/774–7796; G06V 10/25–273; G06V 20/49; G06V 20/695; G06V 40/162; G06V 20/80; G06V 20/698; G06K 9/6256; G06K 9/6257; G06K 9/6259; G06K 9/6224; G06N 3/02–126; G06N 20/00–20

See application file for complete search history.

(56) References Cited

U.S. PATENT DOCUMENTS

| | | | |
|---|---|---|---|
| 8,977,339 | B1 | 3/2015 | Wu et al. |
| 10,249,048 | B1 | 4/2019 | Wang et al. |
| 11,599,996 | B2 | 3/2023 | Isgum et al. |
| 2007/0031019 | A1 | 2/2007 | Lesage et al. |
| 2010/0104160 | A1 | 4/2010 | Lavi et al. |
| 2010/0296709 | A1 | 11/2010 | Ostrovsky-Berman et al. |
| 2011/0081057 | A1 | 4/2011 | Zeng |
| 2012/0041318 | A1 | 2/2012 | Taylor |
| 2015/0112182 | A1* | 4/2015 | Sharma ................ A61B 5/0261 600/408 |
| 2015/0282777 | A1 | 10/2015 | Compas et al. |
| 2015/0356753 | A1 | 12/2015 | Lauritsch et al. |
| 2016/0098531 | A1 | 4/2016 | Wu et al. |
| 2016/0155234 | A1 | 6/2016 | Kang et al. |
| 2016/0166209 | A1 | 6/2016 | Itu et al. |
| 2017/0105694 | A1 | 4/2017 | Grass et al. |
| 2017/0245821 | A1 | 8/2017 | Itu et al. |
| 2018/0310888 | A1 | 11/2018 | Itu et al. |
| 2019/0019286 | A1 | 1/2019 | Passerini et al. |
| 2019/0029519 | A1 | 1/2019 | Itu et al. |
| 2019/0150869 | A1* | 5/2019 | Passerini ............. A61B 6/5217 |
| 2019/0318476 | A1 | 10/2019 | Isgum et al. |
| 2019/0362494 | A1 | 11/2019 | Wang et al. |
| 2021/0085397 | A1 | 3/2021 | Passerini et al. |
| 2021/0110543 | A1 | 4/2021 | Nickisch et al. |
| 2021/0118569 | A1 | 4/2021 | Grass et al. |
| 2021/0158541 | A1 | 5/2021 | Figueroa-Alvarez et al. |
| 2021/0319558 | A1 | 10/2021 | Min et al. |
| 2023/0177677 | A1 | 6/2023 | Yuan et al. |
| 2023/0230231 | A1 | 7/2023 | Tu et al. |
| 2023/0368398 | A1 | 11/2023 | Figueroa-Alvarez et al. |

FOREIGN PATENT DOCUMENTS

| | | | |
|---|---|---|---|
| EP | 2693401 | A1 | 2/2014 |
| WO | 2014/162273 | A1 | 10/2014 |

OTHER PUBLICATIONS

Fu et al., Rapid vessel segmentation and reconstruction of head and neck angiograms using 3D convolutional neural network, Nature Communications, 11(1): 1-12 (Jan. 2020).

International Search Report and Written Opinion from International Application No. PCT/US2023/082167, mailing date May 15, 2024.

Adjoua et al., Reduced-order modeling of hemodynamics across macroscopic through mesoscopic circulation scales, Cornell University Library, 19 pages (2019).

Banerjee et al., A graph theoretic framework for representation, exploration and analysis on computed states of physical systems, Computer Methods in Applied Mechanics and Engineer, 33 pages (2019).

International Application No. PCT/US20/61789, International Preliminary Report on Patentability, mailed Jun. 2, 2022.

International Search Report and Written Opinion from International Application No. PCT/US2020/061789 dated Feb. 15, 2021.

Iyer et al., Abstract 12865: Data-Driven Approach for Coronary Vessel Reconstruction, Circulation, 6 pages (2019).

Kass et al., Snakes: Active Contour Models, International Journal of Computer Vision, 321-331 (1988).

Nasr-Esfahani et al., Segmentation of vessels in angiograms using convolutional neural networks, Biomedical Signal Processing and Control, 40:240-251 (2017).

Raissi et al., Hidden Fluid Mechanics: A Navier-Stokes Informed Deep Learning Framework for Assimilating Flow Visualization Data, ARXIV.org, Cornell University Library, 33 pages (2018).

Raissi et al., Physics Informed Deep Learning (Part I): Data-driven Solutions of Nonlinear Partial Differential Equations, ARXIV.org, Cornell University Library, 22 pages (2017).

Sankaran et al., Physics driven reduced order model for real time blood flow simulations, Cornell University Library, 22 pages (2019).

Yang et al., External force back-projective composition and globally deformable optimization for 3-D coronary artery reconstructions, Phys. Med. Biol. 59:975-1003 (2014).

Yang et al., Novel Approach for 3-D Reconstruction of Coronary Arteries From Two Uncalibrated Angiographic Images, IEEE Transactions on Image Processing, 18(7):1563-1572 (2009).

Zhao et al., Automated coronary tree segmentation for x-ray angiography sequences using fully-convolutional neural networks, 2018 IEEE Visual Communications and Image Processing (VCIP) <https://ieeexplore.ieee.org/xpl/conhome/8694905/proceeding> (Dec. 2018).

Suzuki et al., Acceleration of the poisson solver in incompressible CFD using convolutional neural network, 32nd Symposium on Numerical Fluid Dynamics (Dec. 2018).

Abbasi et al., Curvature scale space image in shape similarity retrieval, Multimedia Systems, 7:467-76 (1999).

Adla et al (NPL "Multimodality Imaging of Carotid Stenosis", International Journal of Angiology vol. 24, Mar. 2015, hereafter referred to as Adla).

Antiga, Generalizing vesselness with respect to dimensionality and shape, Release 1.00 (Aug. 3, 2007).

Buades et al., A non-local algorithm for image denoising, IN: Computer Vision and Pattern Recognition, CVPR 2005, IEEE Computer Society Conference, vol. 2, pp. 60-65 (2005).

Cardiovascular Angiography Analysis System - Caas, Pie Medical Imaging, Sectra, AB, downloaded from the Internet at: <https://www.sectra.com/medical/radiologyimaging/solutions/ris-pacs/add-ons/3rdpartyproviders/piemedical/index.html> (prior art).

(56) References Cited

OTHER PUBLICATIONS

Cerquerira et al., Standardized myocardial segmentation and nomenclature for tomographic imaging of the heart a statement for healthcare professionals from the cardiac imaging committee of the council on clinical cardiology of the American Heart Association, Circulation, 105(4):539-42 (2002).

Dijkstra, A note on two problems in connexion with graphs, Numerische Mathematik, 1:269-71 (1959).

Frangi et al., Multiscale vessel enhancement filtering, In: Wells et al. (eds.), Medical Image Computing and Computer-Assisted Interventation MICCA198, Lecture Notes in Computer Science, vol. 1496, pp. 130-137, Springer Verlag, Berlin, Germany (1998).

Funka-Lea et al., Automatic heart isolation for CT coronary visualization using graph-cuts, 3rd IEEE International Symposium on Biomedical Imaging: Nano to Macro, pp. 614-617 (2006).

Gao et al. "Vessel segmentation for X-ray coronary angiography using ensemble methods with deep learning and filter-based features"; 2022; BMC Medical Imaging (2022)22-10; pp. 1-17. (Year: 2022).

Golsin et al., Robust vessel tree modeling, Medical Image Computing and Computer-Assisted Intervention—MICCAI 2008, pp. 602-611, Springer (2008).

International Application No. PCT/US2023/067202, International Search Report and Written Opinion, mailed Dec. 11, 2023.

Lyer et al. "A multi-stage neural network approach for coronary 3D reconstruction from uncalibrated X-ray angiography images", Oct. 16, 2023; Scientific Reports 13, Article No. 17603 (Year: 2023).

Lyer et al., A multi-stage neural network approach for coronary 3D reconstruction from uncalibrated X-ray angiography images, Scientific Reports, 13(17603):1-17 (Oct. 2023).

Lyer et al., AngioNet: a convolutional neural network for vessel segmentation in X-ray angiography, Scientific Reports, 11(18066):1-13 (Sep. 2021).

Kelm et al., Detection, grading and classication of coronary stenoses in computed tomography angiography, Medical Image Computing and Computer-Assisted Intervention—MICCAI 2011, pp. 25-32, Springer (2011).

Kirbas et al., Vessel extraction techniques and algorithms: a survey, Proceedings of Third IEEE Symposium on Bioinformatics and Bioengineering, pp. 238-245 (2003).

Lorigo et al., Curves: Curve evolution for vessel segmentation, Med. Image Anal., 593):195-206 (2001).

Nain et al., Vessel segmentation using a shape driven flow, Medical Image Computing and Computer-Assisted Intervention—MICCAI 2004, pp. 51-59, Springer (2004).

Nikolaou et al., MRI and CT in the diagnosis of coronary artery disease: indications and applications, Insights Imaging, 2(1):9-24 (2011).

Patton et al., Retinal image analysis: concepts, applications and potential, Progress in Retinal and Eye Research, 25(1):99-127 (2006).

Pham et al., Current methods in medical image segmentation, Annu. Rev. Biomed. Eng., 2:315-37 (2000).

Pizer et al., Adaptive histogram equalization and its variations, Computer Vision, Graphics, and Image Processing, 39:355-68 (1987).

Tomasello et al., Quantitative Coronary Angiography in the Interventional Cardiology, IN: Kirac (ed.), Advances in the Diagnosis of Coronary Atherosclerosis, InTech, pp. 255-273 (Nov. 2011).

Wesarg et al., Localizing calcifications in cardiac CT data sets using a new vessel segmentation approach, J. Digit. Imaging, 19(3):249-57 (2006).

What is Coronary Heart Disease, National Institutes of Health, National Heart, Lung, and Blood Institute (updated Jun. 22, 2016).

International Application No. PCT/US2025/032666, International Search Report and Written Opinion, mailed Sep. 15, 2025.

* cited by examiner

Synthetic Angiograms

FIG. 9

1D Geometric Model
Vessel Paths &
Cross-Sectional Areas

3D Geometric Model

Vessel Tree
Geometric Model    *1105*

Boundary Conditions

-Patient Pressure
-Vessel Flow Rates

*1108*

Frame 1

Frame 2

Frame 2

Frame 1

Frame 3

Frame 0

Estimates Patient-Specific
Flow Rates For Each Vessel

*1107*

ANATOMICAL AND FUNCTIONAL ASSESSMENT OF CORONARY ARTERY DISEASE USING MACHINE LEARNING

CROSS-REFERENCE TO RELATED APPLICATIONS

This application is a Continuation-in-Part of U.S. application Ser. No. 17/861,100, filed Jul. 8, 2022, which is a Continuation of U.S. application Ser. No. 17/101,550, filed Nov. 23, 2020, which claims priority to provisional U.S. Application Ser. No. 62/939,370, filed on Nov. 22, 2019, entitled, Anatomical and Functional Assessment of CAD Using Machine Learning, the entire disclosure of which is hereby expressly incorporated by reference herein.

FIELD OF THE DISCLOSURE

The invention generally relates to the fully automated detection of coronary vessels and their branches in angiograms and, more particularly, to the calculation of a diameter of such vessels, detection of stenosis and determination of the percent narrowing of stenosis and functional flow limitation from the stenosis.

BACKGROUND

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

Coronary Artery Disease (CAD) is among the leading causes of death in the United States, affecting more than 15 million Americans. CAD is characterized by plaque build-up from atherosclerosis in the coronary arteries, which results in the narrowing (also known as stenosis) or blockage of coronary arteries and can lead to symptoms such as angina and possibly myocardial infarction.

Herein, 'state of vessel occlusion' refers to what is commonly understood as CAD, e.g., narrowing (localized or diffused) of the epicardial coronary arteries as seen in imaging studies and characterized by either anatomical or functional indices. Conversely, 'state of microvascular disease' refers to disease in the coronary microcirculation, characterized by the loss of vasodilatory capacity.

The leading invasive diagnostic method for CAD is coronary angiography, in which a contrast agent is injected into a patient's vessels via a catheter and imaged to characterize stenosis severity. This method relies on visualization of anatomic abnormalities and is semi-quantitative, as visual inspection simply approximates the percent area reduction of the lumen. Reductions in diameter that are estimated to be 70% or greater often result in further evaluation or a revascularization procedure, e.g., a coronary stent placement.

A physiologic-based and more quantitative approach to assess coronary stenosis is to compute Fractional Flow Reserve (FFR), a metric defined as the ratio between hyperemic flow in a diseased artery and the expected hyperemic flow in the same artery without stenosis. In the coronary artery, for example, FFR can be expressed as the ratio of a distal coronary pressure to a proximal coronary pressure. For example, a FFR lower than 0.80 indicates the presence of a severe stenosis requiring revascularization due to the compromised flow to the vascular bed distal to the vessel. Revascularization decisions that incorporate FFR have been shown to improve outcomes compared to angiography alone. Determination of FFR is also robust to different patient geometries, accounting for the contributions of collateral vessels to flow and lesion geometry, for example.

Despite its benefits, healthcare professionals often do not measure FFR for a patient, due to the invasive nature of using a catheter-based pressure measurement. Some have found that physicians choose not to perform FFR in nearly two-thirds of all cases, citing the risk to the patient, lack of resources, and additional cost. Another drawback of FFR is its variability due to different hemodynamic conditions, within a patient.

There is a need for more accurate and less-invasive techniques for diagnosis CAD. More specifically, there is a need for a non-invasive, user-independent approach for FFR measurement that would not pose a risk to the patient.

Recently, some have proposed non-invasive computational workflows for determining FFR and assessing CAD severity. These efforts have adopted one of two distinct approaches. A first approach relies on computed tomography angiography (CTA) data to reconstruct the 3D geometry the coronary tree. The vessel lumen is segmented using edge-detection or machine learning algorithms and the output is manually corrected by an expert. Computational Fluid Dynamics (CFD) simulations are run on the CTA-derived vessel geometry, and FFR is computed on the company's servers or on the cloud. While this non-invasive approach has shown promising results in clinical trials, the use of CTA is severely affected by imaging artifacts due to calcification, which make it difficult to delineate the boundaries of the vessel lumen. CTA is also limited in its ability to detect small serial lesions or to capture fine vessel geometry due to its lower spatial resolution compared to angiography. Lastly, CTA data does not provide information on flow, and thus the boundary conditions (BC) for the CFD analysis of hemodynamics typically rely on morphometric or population data and are thus non-patient-specific.

A second approach, also based on non-invasive computational workflows, relies on multi-plane angiography data to reconstruct the vessel geometry before performing physics-based flow simulations. The main benefit of using angiography is its superior capacity to detect the vessel lumen boundary in the presence of calcified stenoses, and the higher spatial resolution compared to CTA, increasing the sensitivity of the geometry reconstruction algorithm. Furthermore, time-resolved angiography has information on how the contrast agent moves through the vessels and can therefore be used to estimate blood velocity and inform the BC for the CFD analysis. However, angiography-based approaches for FFR quantification have a fundamental challenge, namely the reconstruction of the 3D geometry of the vessels of interest from a set of 2D images which are acquired over time and for different positions of the patient table. Furthermore, all angiography-based approaches for FFR quantification have produced workflows that require substantial inputs by an operator to identify the vessels of interest and to assist with the segmentation. Lastly, all angiography-based approaches have either considered reconstruction of a single coronary artery or used highly simplified methods to model the flow physics. These shortcomings effectively counteract the benefit of using high-resolution angiography data, the most commonly performed procedure for CAD diagnosis.

Regardless of the approach, all computational-derived FFR methods have shown poor predictive performance around the critical diagnostic value of FFR=0.8, due to the aforementioned limitations on image data quality, lack of information on flow, need for operator input, and computational modeling assumptions. Therefore, there is currently no pipeline for accurate FFR computation that could be effectively deployed to any hospital in the nation.

A significant need exists for a more accurate and less-invasive techniques for CAD diagnosis, using a non-invasive approach for FFR measurement that is fully-automated.

SUMMARY OF THE INVENTION

Techniques are provided for anatomical and functional assessment of coronary artery disease (CAD) using machine learning and computational modeling techniques. Techniques herein address the shortcomings of conventional CAD assessment, by using novel methodologies for non-invasive Fractional Flow Reserve (FFR) quantification based on angiographically derived anatomy and hemodynamics data, relying on machine learning algorithms for image segmentation and flow assessment, and relying on accurate physics-based computational fluid dynamics (CFD) simulation for computation of the FFR.

In example embodiments, the present techniques provide processes to assess both anatomical and functional severity of CAD through customized machine learning and computational modeling methods, from the use of both static and dynamic coronary angiography data, with the final goal of determining FFR in a less risky and more accurate manner.

The use of functional markers of disease has gained significant traction in the last few years, displacing simpler anatomy-based markers. In the field of cardiology, fractional flow reserve (FFR) is a hemodynamic index (i.e., a normalized pressure gradient under conditions of maximum flow) that has shown better diagnostic outcomes than anatomy-based makers. In example embodiments herein, two-dimensional (2D) angiography data is used, in particular dynamic angiography data that offers descriptions of the transport of a contrast agent (dye) down the vessels of interest. The 2D time-resolved angiography data is used to inform computational simulations thereby obtaining more accurate predictions of the FFR than those without dynamic transport of contrast agent down the vessels. Further still, in example embodiments, three-dimensional (3D) geometric models are generated from the 2D angiography data, and those 3D geometric models are used for simulation of hemodynamic conditions, including FFR.

In accordance with an example, a computer-implemented method for generating enhanced segmentation images for use in determining a state of occlusion within a vessel inspection region, the method comprising: receiving, by one or more processors, angiography image data of a vessel inspection region containing a vessel tree, the angiography image data comprising one or more two-dimensional (2D) angiography images; applying, by the one or more processors, the angiography image data to an angiogram-level vessel segmentation machine learning model trained to generate a segmented image of the vessel tree; applying, by the one or more processors, the angiography image data to a stenosis machine learning model trained to identify and segment stenoses within the vessel tree to generate segmented patch images; determining, by the one or more processes, a degree of stenosis for each segmented patch image within a vessel tree; stitching, by the one or more processors, each segmented patch image into the segmented image of the vessel tree to form an enhanced segmentation image of the vessel tree; and storing the enhanced segmentation image and the determined degree of stenosis for each stenosis, for use in reconstructing a three-dimensional (3D) vessel tree model, performing flow extraction, and determining a state of occlusion in the vessel inspection region.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIG. 9 illustrates images of synthetic angiogram images that may be used for training a vessel segmentation machine learning model and a flow extraction machine learning model, in accordance with an example.

DETAILED DESCRIPTION

Figure 1:
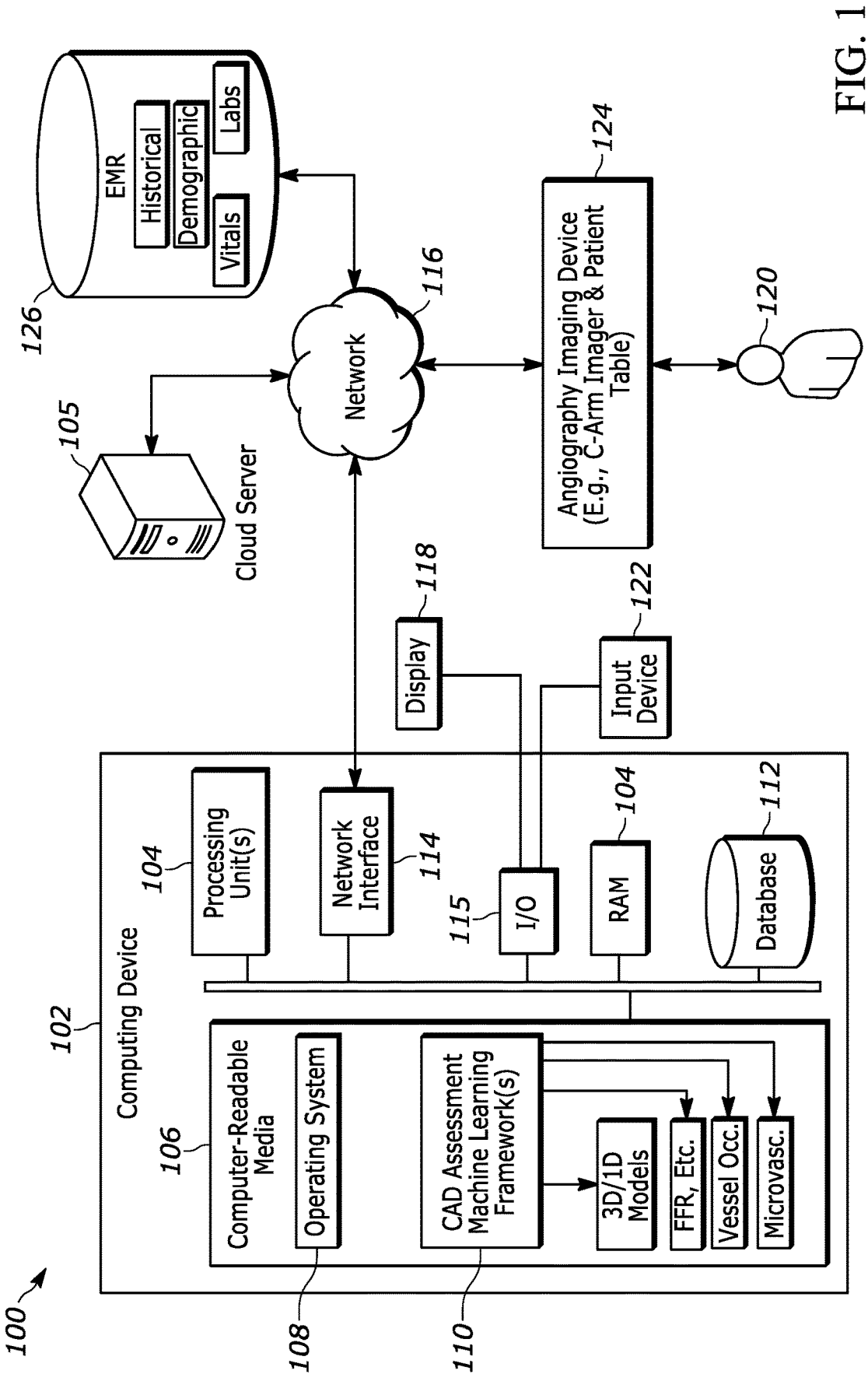
FIG. 1 is a schematic diagram of an example system for performing anatomical and functional assessment of coronary artery disease (CAD), using a machine learning framework for assessing angiography images, in accordance with an example.

Provided are techniques for making anatomical and functional assessments of states of occlusion within vessels (e.g., for assessing coronary artery disease (CAD)) by analyzing dynamic angiography image data, using physics-based machine learning from neural networks, high-fidelity model order reduction (e.g., using Graph Theory and other machine learning techniques), together with machine learning-based anatomical segmentation, and high-fidelity analysis of hemodynamics (e.g., 3D Navier-Stokes), to produce an automated workflow that can offer superior diagnostic performance. Techniques are provided for performing non-invasive Fractional Flow Reserve (FFR) quantification based on angiographic data, relying on machine learning algorithms for image segmentation, and relying on physics-based machine learning and computational fluid dynamics (CFD) simulation for accurate functional assessment of a vessel. In some examples, two-dimensional dynamic angiography data is used to capture the transport of dye down the vessels of interest. This dynamic information can be used to inform the computational simulations and therefore to obtain accurate predictions of the FFR, particularly in borderline cases. Further, although angiography data does not offer three-dimensional anatomical information, the present techniques include processes for deploying image reconstruction algorithms to obtain 3-dimensional (3D) and one-dimensional (1D) geometric models of a patient's vasculature, which are then used for computer simulation of hemodynamics. In addition, the present techniques include improved processes for vessel segmentation by performing both angiography image-level vessel segmentation, stenosis localization, and stenosis-level segmentation to construct enhanced vessel segmentation images that are then used by these vessel tree reconstruction algorithms to generate 3D and 1D geometric models. With such improved processes, the 3D and 1D geometric models contain more accurate anatomical description of stenoses. While techniques are described herein in terms of determining FFR, the same techniques may be used to calculate other flow reserve metrics or other hemodynamic values. Therefore, references in the examples herein to determinations of FFR include determinations of instantaneous wave-free ratio (iFR), quantitative flow ration (QFR), etc.

In some examples, systems and methods are provided for assessing coronary artery disease. The system may receive angiography image data of a vessel inspection region for a subject, the vessel inspection region corresponding to a region of an image data containing a vessel tree structure. That angiography image data may contain a plurality of angiography images captured over a sampling time period. The system may apply that angiography image data to a first machine learning model, a vessel segmentation machine learning model. The vessel segmentation machine learning model may generate two-dimensional (2D) segmented vessel images for the vessel inspection region, and from these 2D segmented vessel images, a 3D geometric vessel tree model is generated modeling vessels with the vessel inspection region. In other examples, a 1D equivalent vessel tree model may be generated from the 3D vessel tree model. The 3D or 1D geometric vessel tree model may be applied to a second machine learning model, a flow extraction machine learning model to assimilate flow data over a sampling time period for one or more vessels within the vessel inspection region. From that assimilated flow data and from the 3D or 1D geometric vessel tree model, a computational fluid dynamics machine learning model is configured to determine states of vessels in the vasculature, where those states may include a state of vessel occlusion and/or a state of microvascular disease/resistance. In particular, to determine microvascular disease/resistance, angiographic images may be acquired under two (2) different hemodynamic states, one being a baseline state and a hyperemic (high flow) state, and a comparison may be made between the two. In yet other examples, the microvasculature may be assessed from examining angiographic images captured during the hyperemic state, only. As used herein, state of occlusion of a vessel refers to a determination of vessel health that includes an assessment of vessel health that is based on anatomical features (e.g., determined from angiography images) and functional features (e.g., determined using a physical model and includes flow data). Therefore, as used herein, state of occlusion should be construed as including, but not limited to, degree of stenosis, length of stenosis, various hemodynamic indices such as FFR, and combinations thereof.

In FIG. 1, a CAD assessment system 100 includes a computing device 102" or "signal processor" or "diagnostic device") configured to collect angiography image data from a patient 120 via an angiography imaging device 124 in accordance with executing the functions of the disclosed embodiments. As illustrated, the system 100 may be implemented on the computing device 102 and in particular on one or more processing units 104, which may represent Central Processing Units (CPUs), and/or on one or more or Graphical Processing Units (GPUs), including clusters of CPUs and/or GPUs, any of which may be cloud based. Features and functions described for the system 100 may be stored on and implemented from one or more non-transitory computer-readable media 106 of the computing device 102. The computer-readable media 106 may include, for example, an operating system 108 and a CAD machine learning (deep learning) framework 110 having elements corresponding to that of deep learning framework described herein. More generally, the computer-readable media 106 may store trained deep learning models, including vessel segmentation machine learning models, flow extraction machine learning models, Graph-theory or other neural network based reduced order models, executable code, etc. used for implementing the techniques herein. The computer-readable media 106 and the processing units 104 may store image data, segmentation models or rules, fluid dynamic classifiers, and other data herein in one or more databases 112. As discussed in examples herein, the CAD machine learning framework 110 applying the techniques and processes herein (e.g., various different neural networks) may generate 3D and or 1D segmented vessel treed geometric models, FFR and other fluid dynamic assessments, state of vessel occlusion data (such as degree of stenosis), and/or microvascular disease data.

The computing device 102 includes a network interface 114 communicatively coupled to the network 116, for communicating to and/or from a portable personal computer, smart phone, electronic document, tablet, and/or desktop personal computer, or other computing devices. The computing device further includes an I/O interface 115 connected to devices, such as digital displays 118, user input devices 122, etc. As described herein, the computing device 102 generates indications of CAD for a subject, which may include states of vessels in the vasculature, such as a state of vessel occlusion (anatomical and functional through an FFR calculation, through an iFR calculation, or through a QFR calculation) and a state of microvascular disease prediction (by contrasting changes in distal resistance when two hemodynamic states are recorded), as an electronic document that can be accessed and/or shared on the network 116.

In the illustrated example, the computing device 102 is communicatively coupled, through the network 116, to an electronic medical records (EMR) database 126. The EMR 126 may be a network accessible database or dedicated processing system. In some examples, the EMR 126 includes data on one or more respective patients. That EMR data may include vital signs data (e.g., pulse oximetry derived hemoglobin oxygen saturation, heart rate, blood pressure, respiratory rate), lab data such as complete blood counts (e.g., mean platelet volume, hematocrit, hemoglobin, mean corpuscular hemoglobin, mean corpuscular hemoglobin concentration, mean corpuscular hemoglobin volume, white blood cell count, platelets, red blood cell count, and red cell distribution width), lab data such as basic metabolic panel (e.g., blood urea nitrogen, potassium, sodium, glucose, chloride, CO2, calcium, creatinine), demographic data (e.g., age, weight, race and gender, zip code), less common lab data (e.g., bilirubin, partial thromboplastin time, international normalized ratio, lactate, magnesium and phosphorous), and any other suitable patient indicators now existing or later developed (e.g., use of O2, Glasgow Coma Score or components thereof, and urine output over past 24 hours, antibiotic administration, blood transfusion, fluid administration, etc.); and calculated values including shock index and mean arterial pressure. The EMR data may additionally or alternatively include chronic medical and/or surgical conditions. The EMR data may include historical data collected from previous examinations of the patient, including historical FFR, iFR, or QFR data. Determinations of stenosis, vascular disease prediction, vascular resistance, CFD simulation data, and other data will be produced in accordance with the techniques herein. The EMR 126 may be updated as new data is collected from the angiography imaging device 124 and assessed using the computing device 102. In some examples, the techniques may provide continuous training of the EMR 126.

In conventional angiography imaging applications, angiography images are captured by the medical imager and then sent to an EMR for storage and further processing, including, in some examples image processing, before those images are sent to a medical professional. With the present techniques, the state of occlusion and state of microvascular disease can be determined at computing device based on the angiography images, and without first offloading those images to the EMR 126 for processing. In total, the techniques proposed herein are able to reduce analysis times for cardiologists considerably, and, in part, due to this bypassing of the EMR 126 for processing. The EMR 126 may be simply poled for data during analysis by the computing device 102 and used for storage of state determinations and other computations generated by the techniques herein. Indeed, there are numerous benefits that result from the faster and more automated analyses resulting from the present techniques. For example, modelling and vessel occlusion/disease state analysis can be performed on vessels corresponding to either left or right coronary trees, separately and sequentially, while still producing results for the cardiologist in minutes, for example using the 3D modeler or 1D modeler as described herein.

In the illustrated example, the system 100 is implemented on a single server. However, the functions of the system 100 may be implemented across distributed devices connected to one another through a communication link. In other examples, functionality of the system 100 may be distributed across any number of devices, including the portable personal computer, smart phone, electronic document, tablet, and desktop personal computer devices shown. In other examples, the functions of the system 100 may be cloud based, such as, for example one or more connected cloud CPU (s) or computing systems, labeled 105, customized to perform machine learning processes and computational techniques herein. The network 116 may be a public network such as the Internet, private network such as research institution's or corporation's private network, or any combination thereof. Networks can include, local area network (LAN), wide area network (WAN), cellular, satellite, or other network infrastructure, whether wireless or wired. The network can utilize communications protocols, including packet-based and/or datagram-based protocols such as internet protocol (IP), transmission control protocol (TCP), user datagram protocol (UDP), or other types of protocols. Moreover, the network 116 can include a number of devices that facilitate network communications and/or form a hardware basis for the networks, such as switches, routers, gateways, access points (such as a wireless access point as shown), firewalls, base stations, repeaters, backbone devices, etc.

The computer-readable media 106 may include executable computer-readable code stored thereon for programming a computer (e.g., comprising a processor(s) and GPU (s)) to the techniques herein. Examples of such computer-readable storage media include a hard disk, a CD-ROM, digital versatile disks (DVDs), an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory)

and a Flash memory. More generally, the processing units of the computing device 102 may represent a CPU-type processing unit, a GPU-type processing unit, a field-programmable gate array (FPGA), another class of digital signal processor (DSP), or other hardware logic components that can be driven by a CPU.

It is noted that while example deep learning frameworks herein are described as configured with example machine learning architectures, any number of suitable convolutional neural network architectures may be used. Broadly speaking, the deep learning frameworks herein may implement any suitable statistical model (e.g., a neural network or other model implemented through a machine learning process) that will be applied to each of the received images. As discussed herein, that statistical model may be implemented in a variety of manners. In some examples, the machine learning model has the form of a neural network, Support Vector Machine (SVM), or other machine learning process and is trained using images or multi-dimensional datasets to develop models for vessel segmentation or fluid dynamics computations. Once these models are adequately trained with a series of training images, the statistical models may be employed in real time to analyze subsequent angiography image data provided as input to the statistical model for determining the presence of CAD and for determining vessel occlusion status and disease. In some examples, when a statistical model is implemented using a neural network, the neural network may be configured in a variety of ways. In some examples, the neural network may be a deep neural network and/or a convolutional neural network. In some examples, the neural network can be a distributed and scalable neural network. The neural network may be customized in a variety of manners, including providing a specific top layer such as but not limited to a logistics regression top layer. A convolutional neural network can be considered as a neural network that contains sets of nodes with tied parameters. A deep convolutional neural network can be considered as having a stacked structure with a plurality of layers. The neural network or other machine learning processes may include many different sizes, numbers of layers and levels of connectedness. Some layers can correspond to stacked convolutional layers (optionally followed by contrast normalization and max-pooling) followed by one or more fully-connected layers. The present techniques may be implemented such that machine learning training may be performed using a small dataset, for example less than 10,000 images, less than 1000 images, or less than 500 images. In an example, approximately 400 images were used. To avoid overfitting, a multi-fold cross validation process can be used (e.g., a 5 fold cross validation). In some examples, to avoid overfitting, a regularization process, such as L1 or L2, can be used. For neural networks trained on large datasets, e.g., greater 10,000 images, the number of layers and layer size can be increased by using dropout to address the potential problem of overfitting. In some instances, a neural network can be designed to forego the use of fully connected upper layers at the top of the network. By forcing the network to go through dimensionality reduction in middle layers, a neural network model can be designed that is quite deep, while dramatically reducing the number of learned parameters.

Figure 2:
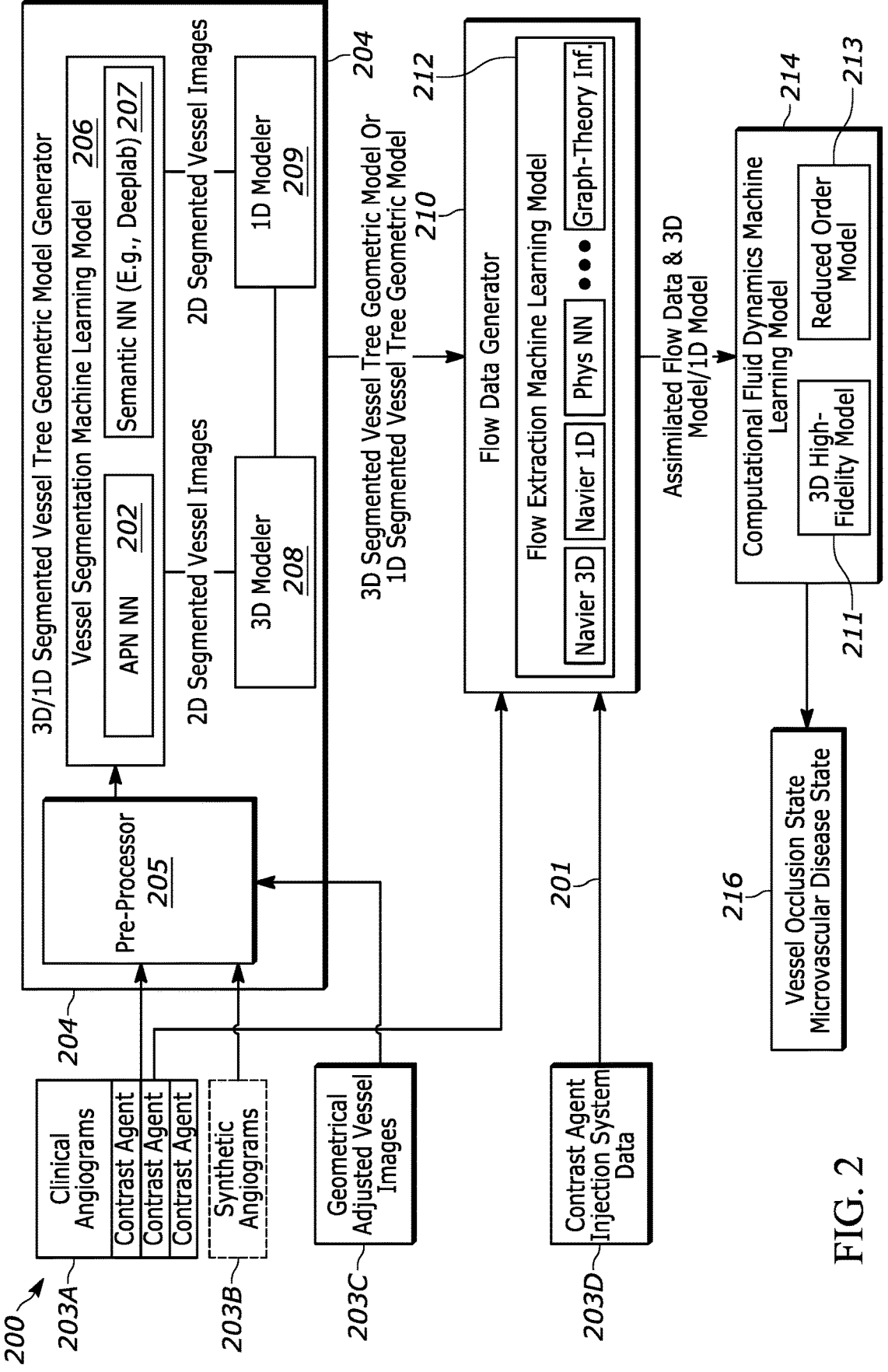
FIG. 2 is a schematic diagram of a CAD assessment machine learning and computational modeling framework as may be implemented in the system of FIG. 1, in accordance with an example.

FIG. 2 illustrates an example deep learning framework 200 that be an example of the CAD machine learning framework 110 of the computer device 102. The framework 200 includes a 3D/1D segmented vessel tree geometric model generator 204 including a pre-processor stage 205, and a vessel segmentation machine learning model 206 that includes two neural networks, an angiographic processing neural network (APN) 202 and a second stage, semantic neural network 207.

In the illustrated example, the pre-processor 205 receives clinical angiogram images 203A, along with data on the contrast agent injection used to form the same. Optionally, the pre-processor 205 may be coupled to receive synthetic angiogram images 203B, for example, for machine learning training. Further, the pre-processor 205 may be coupled to receive geometric adjusted vessel images 203C. In some examples, these inputs may feed directly to the vessel segmentation machine learning model 206, more specifically to the APN 202. The pre-processor 205 is capable of performing various pre-processing on the received image data that may include a de-noising process, a linear filtering process, an image size normalization process, and a pixel intensity normalization process to received image data.

Figure 5:
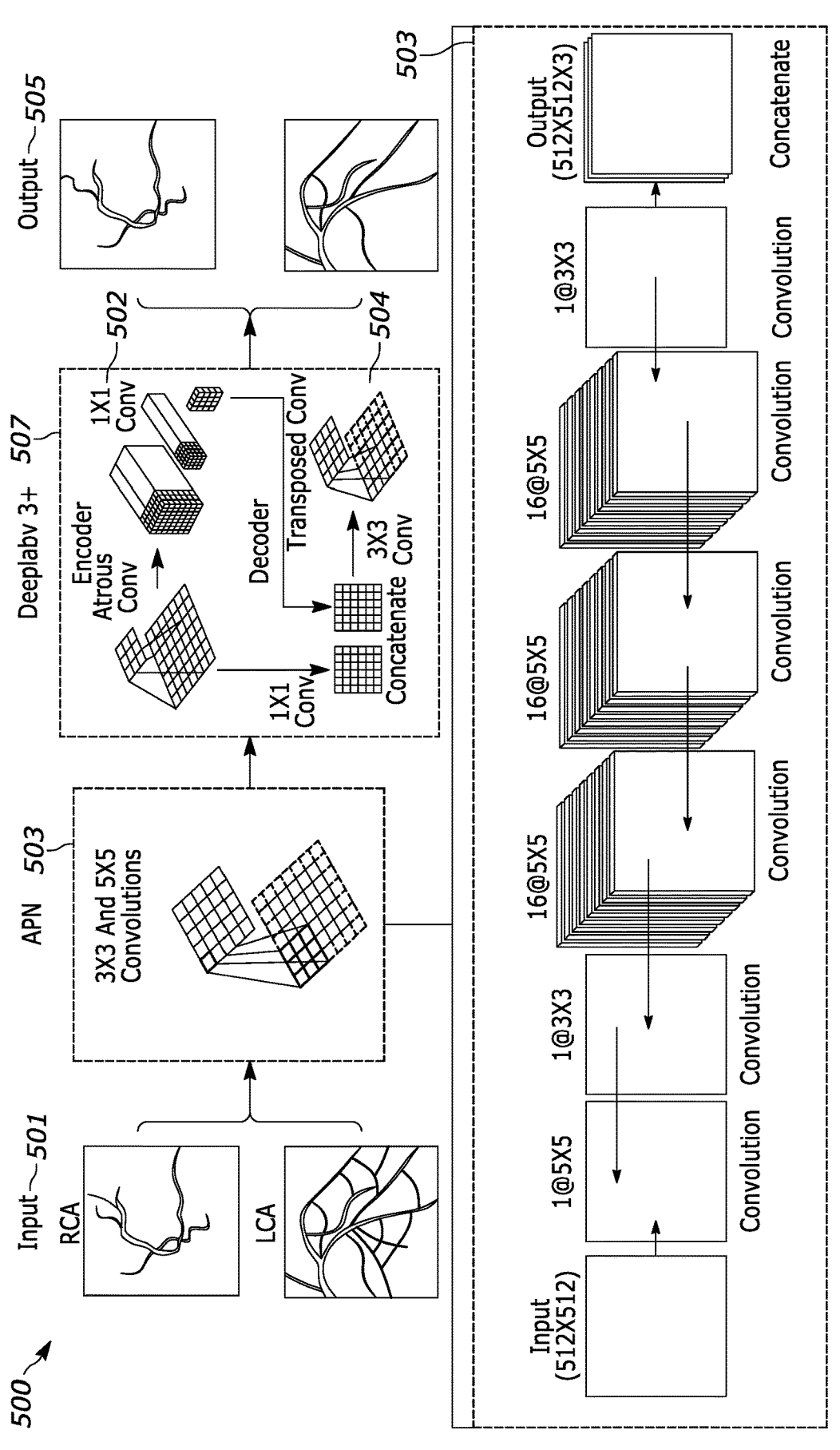
FIG. 5 illustrates an example configuration of the vessel segmentation machine learning model of FIG. 4.

The deep learning framework 200 may operate in two different modes: machine learning training mode and analysis mode. In machine learning training mode of the framework, the angiogram image data 203A, the synthetic angiogram image data 2036, and/or the geometrically adjusted angiogram image data 203C (such as horizontal or vertical flips, arbitrary levels of zoom, rotation, or shearing) may be provided to the APN 202. Different pre-processing functions and values may be applied to the received image data depending on the data type and data source. In analysis mode, in which the machine learning models have been trained, captured angiography image data 203A for a subject is provided to the APN 202 for analysis and CAD determination. In either mode, the pre-processed image data is provided to the 3D/1D segmented vessel tree geometric model generator 204 that includes the vessel segmentation machine learning model 206 that receives the pre-processed image data and performs processes at the APN 202 and the semantic NN 207 and, in an analysis model, generates 2D segmented vessel images. Thus, the vessel segmentation machine learning model 206 may be a convolution neural network, such as two different convolution neural networks in staged configuration, as shown in the example of FIG. 5. Thus, in some examples, the semantic NN 207 is configured as a modified or unmodified Deeplab v3+ architecture.

The 3D/1D segmented vessel tree geometric model generator 204 further includes a 3D modeler 208 configured to generate a 3D vessel tree geometric model of the target region based on the 2D segmented vessel images. The 3D modeler 208 is an example of a 3D reconstruction modeler, as described herein.

Once the 3D vessel tree model is generated, the generator 204 may apply a further smoothing algorithm and/or surface spline fitting algorithm to further improve the 3D vessel tree model for 3D (e.g., high-fidelity) flow dynamics classification and occlusion analysis.

To decrease processing time and improve analysis of the state of vessel occlusion in larger vessels and the state of microvascular diseases in smaller vessels, in some examples, the techniques here are implemented with a reduced order model. In some examples, the 3D segmented vessel tree geometric model generated from the captured 2D angiography images, is further reduced to generate a 1D segmented vessel tree geometric model, in which sufficiently data is maintained to nonetheless provide for flow data generation, fluid dynamics modelling, FFR, iFR, or QFR determinations, and computational fluid dynamics modelling. To implement model order reduction, in some examples, the vessel tree geometric model generator 204 includes a 1D modeler 209. The 1D model 209 produces a skeletonization of the 3D segmented vessel tree model, given by pathlines/centerlines in 3D-space of the vessels included in the 3D segmented vessel tree model, and a series of 2D cross-sectional contours separated by arbitrary distances along each pathline/centerline of the tree. An example 1D segmented vessel geometric tree model generated from a 3D segmented vessel geometric tree model is shown in FIG. 6C, 1D model 680, which is a vessel tree with M branches, N points, 4 values per point, and in FIG. 7 (1D model 703). In the illustrated example, the 1D model 680 has M=3 branches and a total of N=21 points, where each point has three cartesian coordinate values (x, y, z), indicating where the point is in a reference cartesian coordinate system, and a radius value, indicating a determined vessel radius at the point. The determined radius may be a radius to an inner vessel wall or an outer vessel wall, for example.

The 3D or 1D vessel tree geometric models from generator 208 or 209 are provided to a flow data generator 210, which includes a flow extraction machine learning model 212, which may include at least one method of the type: convolutional neural network (CNN), autoencoder, long short-term memory (LSTM), or a Graph-theory based reduced order model of flow and pressure.

Figure 8:
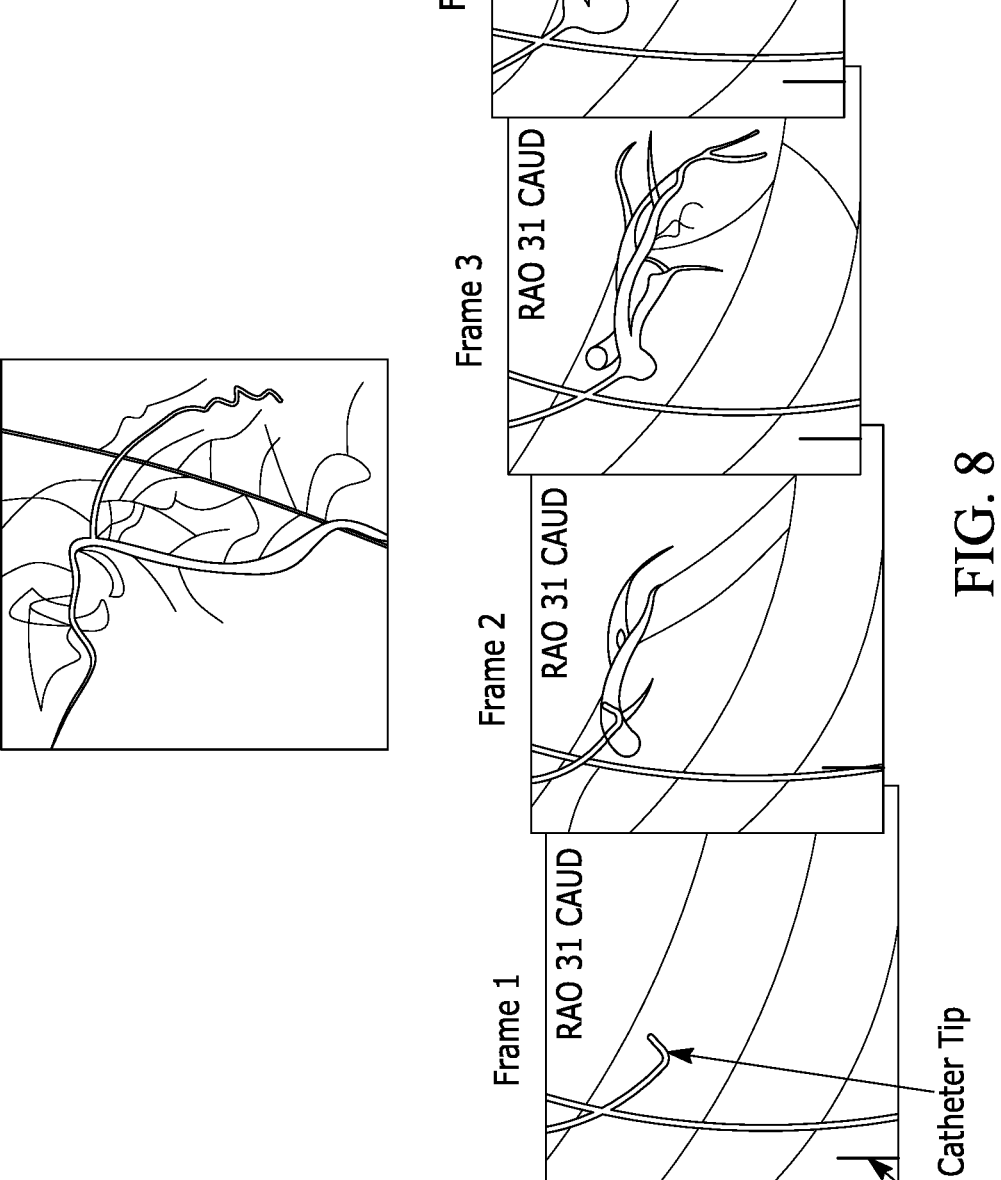
FIG. 8 illustrates images of clinical angiogram images that may be used for training or prediction of a vessel segmentation machine learning model and a flow extraction machine learning model, in accordance with an example.
Figure 12:
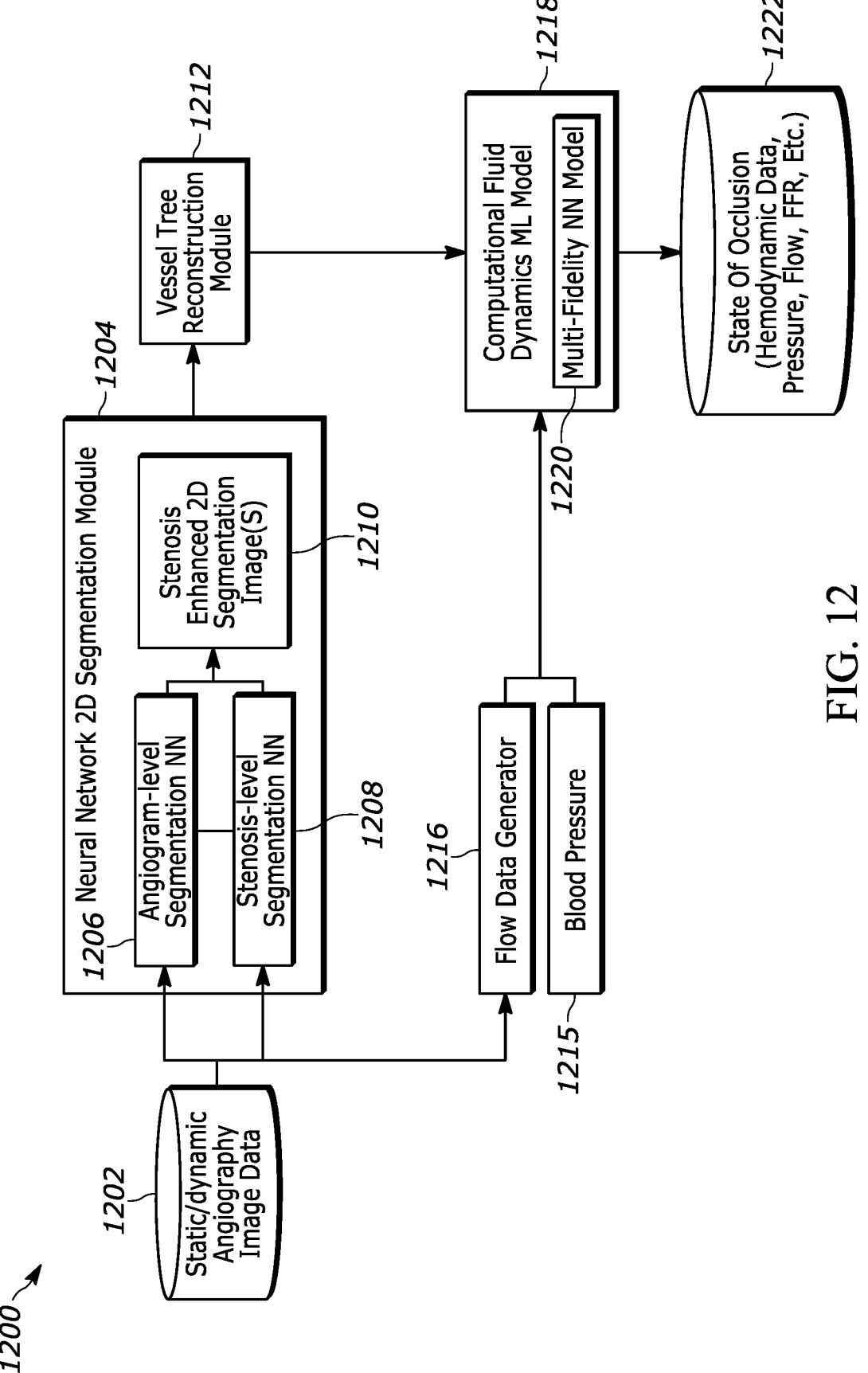
FIG. 12 illustrates an example workflow of performing stenosis-level localization and segmentation for improved stenosis measurement and improved generation of a 2D segmentation images, in addition to the workflows for vessel tree reconstruction, flow data generation, and computational fluid dynamics machine learning models, in accordance with an example.

As shown, the flow extraction machine learning model 212 may include many different types of models, trained and untrained. In some examples, the flow extraction machine learning model 212 is a Navier Stokes informed deep learning framework configured to determine pressure data and velocity data over a 3D vessel space or a 1D vessel space depending on the modeler providing input 208 or 209. In some examples, the Navier Stokes informed deep learning framework includes one or more methods of the type: Kalman Filtering, Physics-informed Neural Network, iterative assimilation algorithm based upon contrast arrival time at anatomical landmarks, and TIMI frame counting. Dynamic data on a series of images describing the transport of the dye down the vessels of interest (see, e.g., FIG. 8) is used to assimilate information on blood velocity. For example, the clinical angiograms 203A, as dynamic angiograms showing a progression of fluid flow in a vessel tree of a vessel inspection region may be provided to the flow data generator 210. In some examples a contrast agent injection system 203D with precise information on pressure applied to the bolus of dye, volume of dye, timing, etc., may be used to acquire dynamical clinical angiograms of contrast agent movement through a vessel tree and provide the images to the flow extraction machine learning model, as shown as well. As shown in FIG. 12 below, in various examples, a flow data generator receives only dynamic angiogram images and generates flow data that is later combined with 3D vessel tree model/1D vessel tree model derived data.

More generally, the flow extraction machine learning model 212 is configured to determine assimilated flow data over the sampling time period for one or more vessels within a 3D vessel tree geometric model or 1D vessel tree geometric model. Such a determination may include determining pressure and/or flow velocity for a plurality of connected vessels in the 3D vessel tree geometric model or 1D vessel geometric tree model.

In some examples, lumped parameter boundary condition parameters are determined by the flow extraction machine learning model 212 for one or more vessels in the vessel inspection region. In some examples, the flow extraction machine learning model 212 determines a lumped parameter model of flow for a first vessel and determines a lumped parameter model of flow for each vessel branching from the first vessel. Any of these may then be stored as assimilated flow data.

The assimilated flow data from the flow data generator 210 and the 3D vessel tree model (or 1D vessel tree model) are provided to a computational fluid dynamics machine learning model 214 that may apply physics-based processes to determine a state of vessel occlusion for the one or more vessels within the 3D vessel tree model (or 1D vessel tree model) and/or a state of microvascular disease for the one or more vessels (collectively labeled 216). While described in various examples as a machine learning model, in other examples the computational fluid dynamics model is implemented without using machine learning techniques. In some examples, the computational fluid dynamics machine learning model includes one or more of: multi-scale 3D Navier-Stokes simulations with reduced-order (lumped parameter) models; reduced-order Navier-Stokes (1D) simulations with reduced-order models, reduced-order models derived from a Graph Theory framework relying on 1D nonlinear theory models; reduced order model simulations (lumped parameter models, 0D) models; or models based on Neural Networks for the entire segmented vessel tree models, obtained through discrepancies between ground truth data (in-silico or clinical) including geometry, pressure, flow, and indices such as FFR, iFR, or QFR. In the example shown, the computational fluid dynamics machine learning model includes at least a 3D high-fidelity model 211 and a reduced order model 213, which could be a graph-theory model, a multi-fidelity neural network model, or other model, in accordance with examples herein.

Any of the techniques herein to define a reduced order model can generate faster results in comparison to occlusion analysis techniques based on high-fidelity 3D techniques. Furthermore, the techniques herein can model and analyze not only large vessels but also the microvasculature and thus are able to determine state of occlusion in large vessels and state of microvascular disease in small vessels.

In some examples, the computational fluid dynamics machine learning model 214 is configured to determine FFR, iFR, and/or QFR for the one or more vessels in the 3D vessel tree model or 1D vessel tree model from the flow data. In some examples, the computational fluid dynamics machine learning model 214 is configured to determine the state of vessel occlusion from the FFR, iFR, and/or QFR for the one or more vessels. In some examples, the computational fluid dynamics machine learning model 214 is configured to determine coronary flow reserve (CFR) for the one or more vessels from the flow data, from one or more physiological states (baseline and hyperemic), and to determine the state of microvascular disease from the CFR for the one or more vessels. Determining the state of vessel occlusion includes determining a presence of stenosis in the one or more vessels. Determining the state of microvascular disease includes determining the lumped parameter models on the boundaries of the vessels in vessel inspection region.

Figure 3:
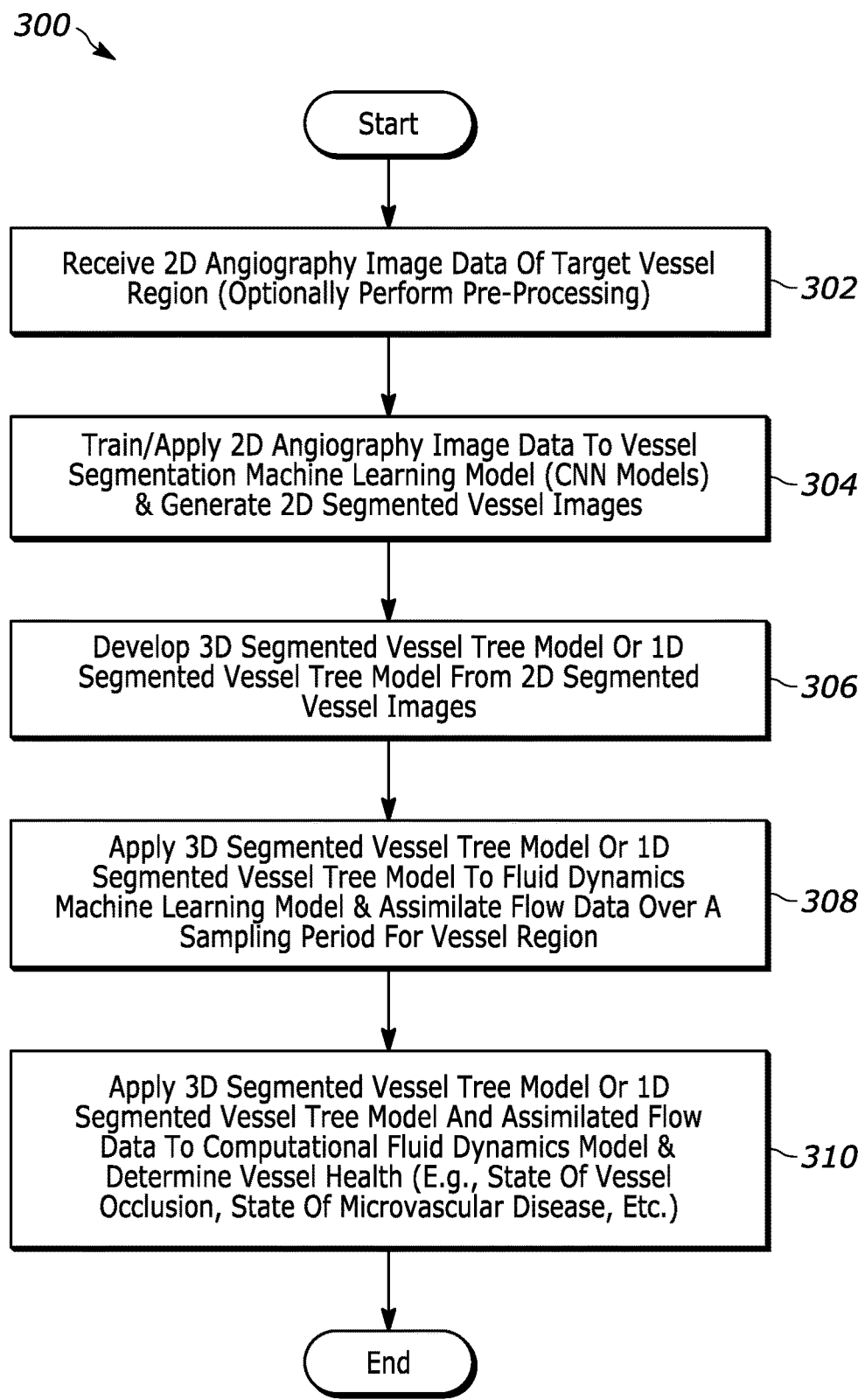
FIG. 3 is a process flow diagram of a method of assessing coronary artery disease, in accordance with an example.

In FIG. 3, a process 300 is shown for assessing coronary artery disease as may be performed by the system 100. 2D angiography image data is obtained by the medical imager 116 and provided to the computer device 102, at a process 302, where optionally pre-processing operations may be performed. In a training mode, the 2D angiography image data may be captured clinical angiogram image data, but such training data may further include synthetic image data, geometrically adjusted image data, etc., as shown in FIG. 2.

Figure 9:
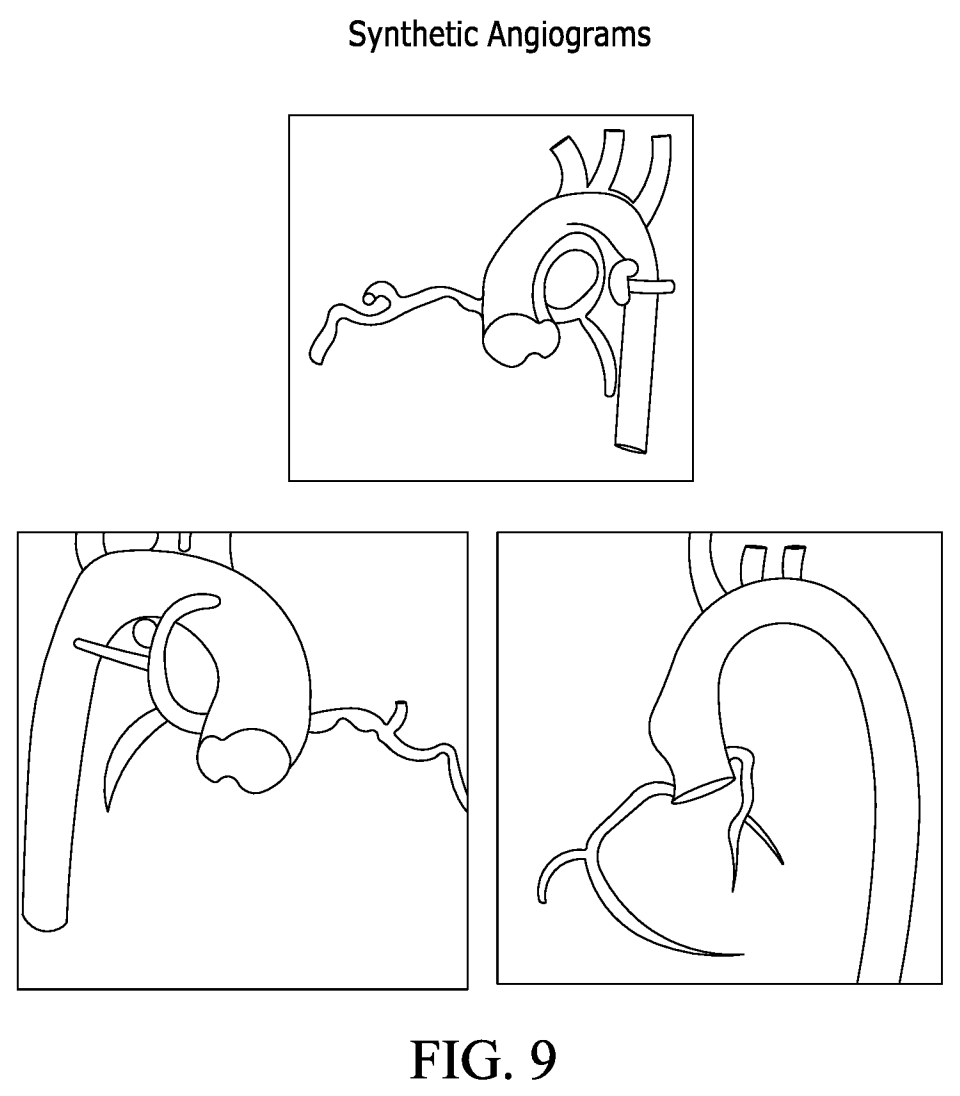

In an example, training of the vessel segmentation machine learning model 206 was performed on 462 clinical angiogram images (see, e.g., FIG. 8) augmented through a combination of geometric transformations (zoom, horizontal flip, vertical flip, rotation, and/or shear) to form over 500, 000 angiogram images and 461 synthetic angiogram images (see, e.g., FIG. 9) augmented through those geometric transformations into an additional set of over 500,000 images. The clinical angiogram images may include time series data in a plurality of frames with segmentation for extraction velocity throughout the entire vessel tree, as shown. In some examples, the vessel segmentation machine learning model 206 includes a synthetic images generator configured to generate synthetic images using a combination of transformations such as flipping, shearing, rotation, and/or zooming. In any event, these numbers of images are provided by way of empirical example only, as any suitable number of training images, captured or synthetic, may be used. In a training mode, the image data is applied to the CAD assessment machine learning framework 110 for generating two types of models, the vessel segmentation machine learning model 206 and the flow extraction machine learning model 212. In diagnostic mode, the image data is applied to the CAD assessment machine learning framework 110 for classifications and diagnosing CAD (in diagnostic mode, the image data is also fed to the machine learning model 206 and the flow extraction machine learning model 212).

At a process 304, the CAD assessment machine learning framework 110, for example, through the APN 202 and the semantic NN 207 of the vessel segmentation machine learning model 206, applies the received image data to a vessel segmentation machine learning model and generates 2D segmented vessel images. The CAD assessment machine learning framework 110, such as through the 3D modeler 208, receives the 2D segmented vessel images and generates a 3D segmented vessel tree model or a 1D segmented vessel tree model, at a process 306.

At a process 308, the 3D segmented vessel tree model or a 1D segmented vessel tree model is applied to the flow extraction machine learning model 212 of the flow data generator 210, and assimilated flow data is generated over a sampling period for one or more vessels in the 3D vessel tree model or in the 1D segmented vessel tree model.

At a process 310, the assimilated flow data and the 3D vessel tree model or a 1D segmented vessel tree model are applied to the computational fluid dynamics machine learning model 214, which assesses the data, using a either the 3D segmented vessel tree model or a 1D vessel tree model, and determines vessel health, such as through a determination of a state of vessel occlusion via indices such as the FFR, iFR, QFR, or others, by solving either the 3D Navier-Stokes equations, a graph-theory-based reduced order model, or other neural network reduced order model. If data on two hemodynamic states is available (e.g. baseline and hyperemic conditions), a state of microvascular disease, or CFR, will be determined from the lumped parameter values of the boundary conditions for each hemodynamic state.

Figure 4:
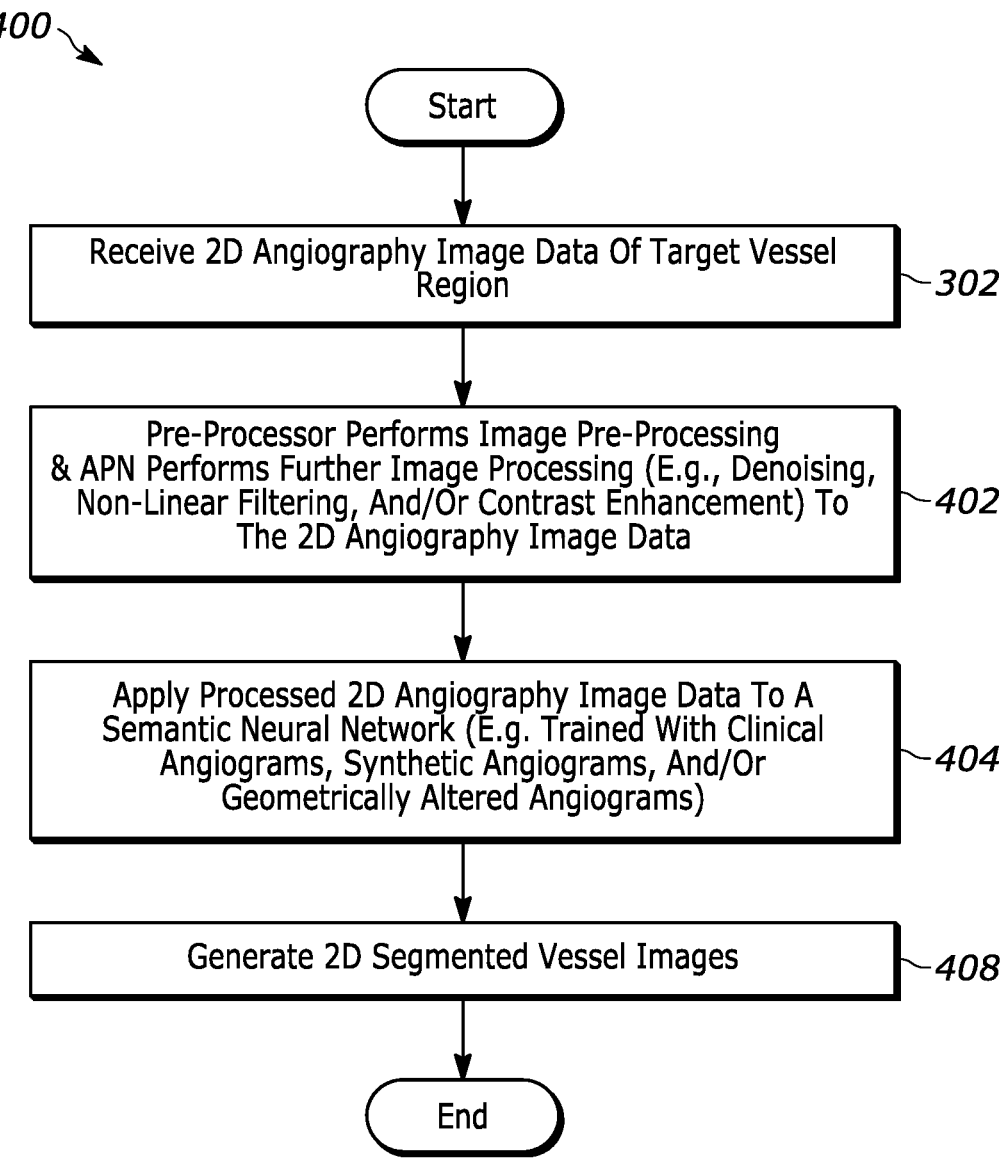
FIG. 4 is a process flow diagram of a method of generating two-dimensional (2D) segmented vessel images from angiography image data, as may be executed by a vessel segmentation machine learning model, as part of the method of FIG. 3, in accordance with an example.

Process 400, shown in FIG. 4, is an example implementation of the process 304 for generating the 2D segmented vessel images from angiography image data that may be performed by the angiographic processing network 202 and the semantic NN 207 of the vessel segmentation machine learning model 206. Initially, the 2D angiography image data for a target vessel region is received, at the process 302. At a process 402, image pre-processing is applied (including an image size normalization process, and/or a pixel intensity normalization process) before further image processing via an angiographic processing network implemented with a convolutional neural network (e.g., APN 202), where the further pre-processing may include a non-linear filtering process, de-noising, and/or contrast enhancement, which, when combined with a process 404 filters out objects such as catheters and bony structures. That is, at the process 404, the pre-processed 2D angiography image is applied to a second convolution neural network (CNN) trained using clinical angiography image data, synthetic image data, and/or geometrically altered image data (e.g., the semantic NN 207). FIG. 5 illustrates an example CNN framework 500 configured with a combination of an angiographic processing network (APN) 503 and a semantic NN in the form of a Deeplab v3+ network 507, configured to generate the 2D segmented vessel images at process 408. The Deeplab v3+ network 507 is a semantic segmentation deep learning technique that includes an encoder 502 and a decoder 504. A series of angiography images 501 are provided as inputs to an angiographic processing network 503, composed of several 3×3 and 5×5 convolutional layers, which applies non-linear filters that perform contrast enhancement, boundary sharpening, and other image processing functions. The APN 503 together with the semantic NN 507 form a vessel segmentation machine learning model, such as the model 206. The APN 503 that feeds the encoder 502, which applies atrous convolutions to the image data, which deploys a rate that controls the effective field of view of each convolution layer. The larger the rate the greater the area of image capture for convolution and low-level feature extraction as may be performed on each input image. For example, rates of 6, 12, and 18 may be used to affect different fields of view to capture different features, for example, features at different resolutions. Using the atrous or dilated convolutions, a dilated sample of an image, or image portion, is convolved to a smaller image. The encoder 502 determines low level features using several atrous convolution strides, then applies a 1×1 (depthwise separable) convolution to combine the outputs of the many different atrous convolutions. This produces a single matrix of features pertaining to different classes, which is input into to the decoder 504, along with high level features determined from 1×1 convolutions applied to the original input image. The convolutions of the encoder 502 may be performed using atrous or depthwise convolutions, in some examples. The decoder 504 concatenates the low level and high-level features into a stacked matrix, then applies transposed convolutions to this matrix, using a fractional stride size to assign class labels to each pixel based on spatial and feature information. These transposed convolutions generate a probability map which determines how likely it is that each pixel belongs to the background or vessel class. The Softmax function is applied to generate the output segmented 2D images 505, as shown.

Figure 6A:
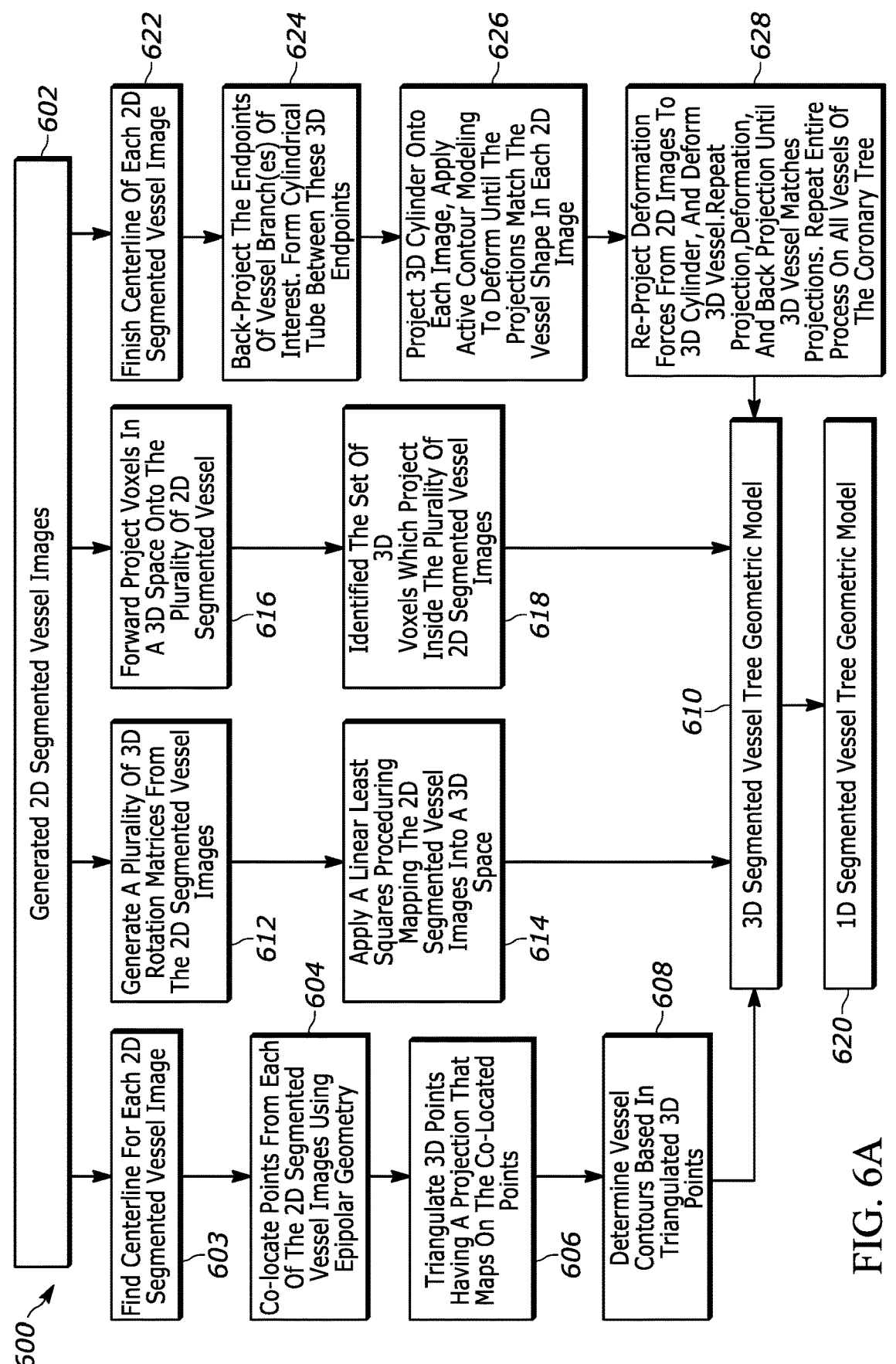
FIG. 6A is a process flow diagram of a series of example methods of generating a three-dimensional (3D) segmented vessel tree model from 2D segmented vessel images generated the process of FIG. 4, in accordance with an example.

In FIG. 6A, a process 600 is shown that may be performed by the 3D segmented vessel tree model generator 204 to generate the 3D segmented vessel tree model from a set of generated 2D segmented vessel images 602. As shown, any one of four different pipelines may be used to generate the 3D segmented vessel tree model, from which a 1D segmented vessel tree model can also be obtained, in accordance with an example.

In a first configuration, at a process 603, the 3D modeler 208 receives the 2D segmented vessel images and finds a centerline for each of the 2D segmented vessel images. At a process 604, the 3D modeler 208 co-locates points from each of the 2D segmented vessel images using geometric tools which may include epipolar geometry, projective geometry, Euclidean geometry or any related geometric tools, and, at a process 606, triangulates 3D points having a projection that maps on the co-located points (back-projection). The local radius of the vessel is determined from each 2D segmented vessel, and these radius vectors are projected onto the 3D centerline. From there, at process 608, the 3D modeler 208 determines vessel contours based on the triangulated 3D points and the 3D vessel tree model is generated, at a process 610. From there, a 1D vessel tree model is generated a process 620.

In second configuration, the 3D modeler 208 generates a plurality of 3D rotation matrices from the 2D segmented vessel images, at a process 612. The 3D modeler 208 then generates the 3D segmented vessel tree model by solving a linear least squares system of equations mapping the plurality of the 2D segmented vessel images into a 3D space, at a process 614.

In third configuration, the 3D modeler 208 forward projects voxels in a 3D space onto the plurality of 2D segmented vessel images, at a process 616, and identifies the set of 3D voxels which project inside the plurality of 2D segmented vessel images, at a process 618. The resulting binary volume is then smoothed to ensure a realistic vessel boundary.

In a fourth configuration, active contours models are used to reconstruct the 3D geometry of the vessel. The finish centerline of each 2D segmented vessel image is performed, at a process 622. The endpoints of each vessel are identified in the plurality of 2D segmented vessel images and back-projected, at a process 624, to identify the endpoints in 3D space. A 3D cylinder is drawn between these 3D endpoints, and external and internal forces on this cylinder are defined by material properties, imaging parameters of the system, and re-projection error between the cylinder and the plurality of 2D segmented images, as contour modeling to deform until the projections match the vessel shape in each 2D image, at a process 626. At a process 628, a re-project deformation is performed forcing the 2D images to the 3D cylinder where a deformation may be performed. The forces deform the cylinder in order to minimize the re-projection error. The process 628 may be repeated for all branches of the vessel until the full coronary tree is reconstructed.

Figure 6B:
FIG. 6B is a process flow diagram of another example method for generating a three-dimensional (3D) segmented vessel tree model from 2D segmented vessel images as may be generated the process of FIG. 4, in accordance with an example.
Figure 6B:
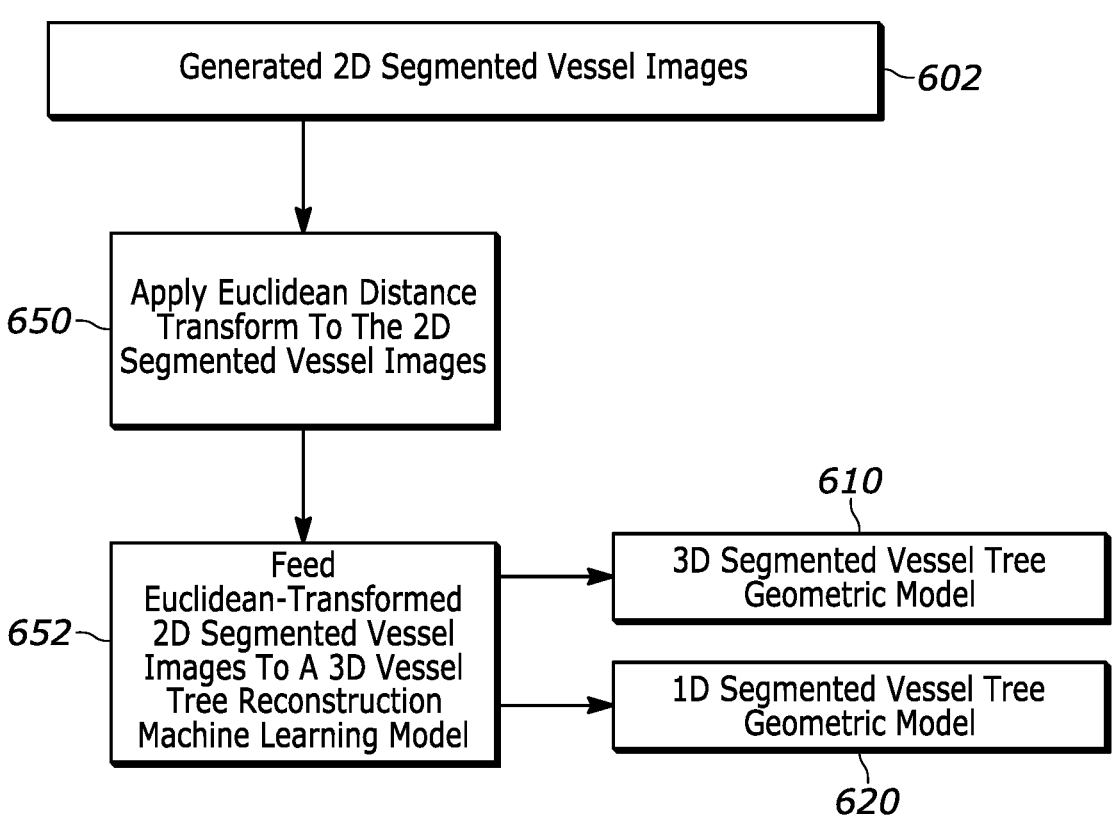
Figure 6C:
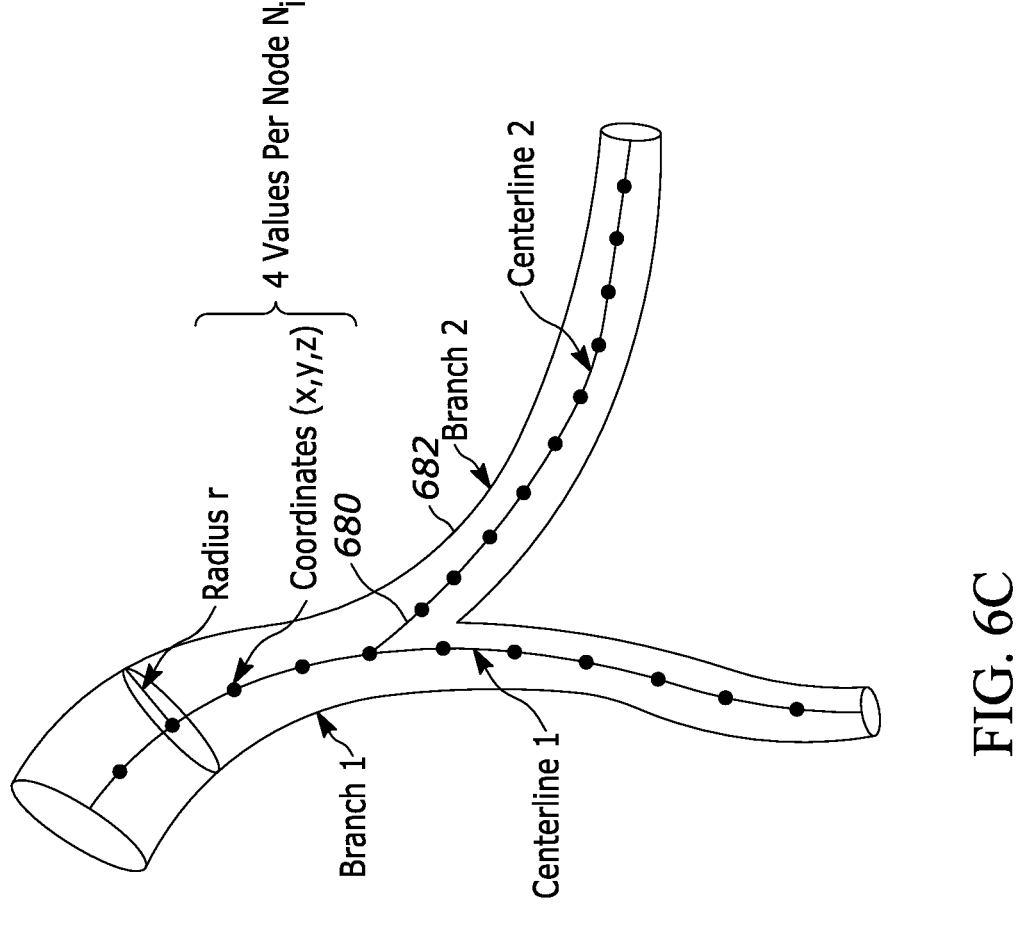
FIG. 6C illustrates an example generated 3D and 1D segmented vessel tree model as may be generated by the processes of FIGS. 6A and 6B, in accordance with an example.

In a fifth configuration (of process 600), shown in FIG. 6B, an Euclidean distance transform is applied (process 650) to the segmented vessel images 602 to encode the 2D diameter of each branch. The set of Euclidean-transformed segmented vessel images from process 650 are fed to a 3D vessel tree reconstruction machine learning model at process 652 trained to reconstruct 3D vessel trees. The representation of such trees can be either 3D (610) or 1D (620) generated directly from the machine learning model of process 652.

FIG. 6C illustrates an example of both a 3D vessel tree model 682 and the 1D vessel tree model 680 discussed above. In the illustrated example, the vessel tree i is represented by a tree matrix $M_i \times N_i \times 4$, where $M_i$ is the number of branches in the vessel tree i, $N_i$ is the number of points on each branch centerline, and 4 is the data encoded in each point of the branch centerline, specifically its three-dimensional coordinates (x, y, z) and radius r. The 3D vessel tree model 682 is given by a smooth analytical surface encompassing the volume occupied by all branches $M_i$. The 1D vessel tree model 680 is given by the centerline coordinates and values of radius of each point $N_i$ for each branch $M_i$.

The flow extraction machine learning models 212 herein are, in some examples, implemented as physics informed neural networks, in particular neural networks capable of encoding any underlying physical laws that govern a given dataset, and that can be described by partial differential equations. For example, the flow extraction machine learning model may include partial differential equations for the 3D Navier-Stokes equations, a set of 4 partial differential equations for balance of mass and momentum, whose unknown fields are a 3D velocity vector ($v_x$, $v_y$, $v_z$) and a scalar p.

In an example, a solution to the flow within the 3D vessel tree model is generated using in the incompressible 3D Navier-Stokes equations of flow, according to Equations (1) and (2):

$$\rho \vec{u}_{,t} + \rho \vec{u} \cdot \nabla \vec{u} = -\nabla p + div(\underline{\tau}) + \vec{f} \qquad \text{(1) \& (2)}$$

$$div(\vec{u}) = 0$$

where u is the fluid velocity, p is the pressure, f is a body force (here, assumed to be zero), and $\tau = 2 \mu D$ with $$D = \frac{1}{2}(\nabla \vec{u} + \nabla \vec{u}^T)$$

is the viscous stress tensor for a Newtonian fluid.

Figure 7:
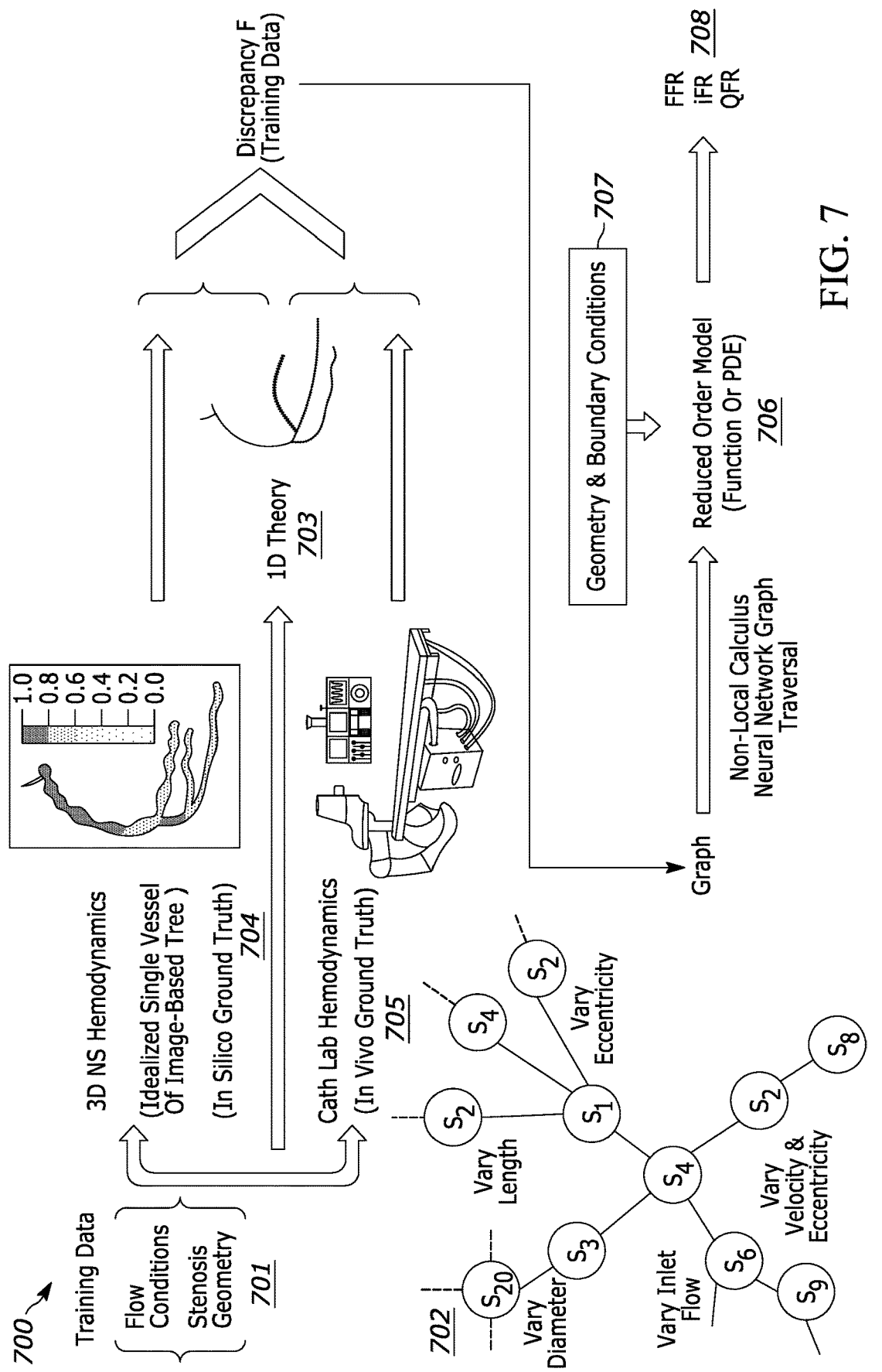
FIG. 7 illustrates a process to define a graph-theory based reduced order model capable of accurately and efficiently characterizing the functional state of CAD, in accordance with an example.

Alternatively, in some examples, the flow extraction machine learning model 212 may include a graph-theory based reduced order model, as illustrated in FIG. 7. The graph-theory based reduced order model may be run in machine learning mode or in analysis mode. In machine learning mode, training data 701 on flow, stenosis geometry, measured values of FFR, iFR, QFR, etc. are used to define a dense graph of discrepancies 702 between ground truth data and a low-fidelity model of flow, given by a 1D non-linear theory model 703. The ground truth data can be given by either in silico simulations of 3D Navier-Stokes equations 704 or by in vivo data acquired in the catheterization laboratory 705. A dense graph of discrepancies 702 may be generated by analyzing a large number of permutations of stenosis diameter, length, eccentricity, flow through the stenosis, or a combination thereof. Once a dense graph of discrepancies is generated, a reduced order model 706 may be derived through nonlocal calculus, deep neural networks, or direct traversal over the vertices of the graph. The reduced order model may be an algebraic equation, or an ordinary or partially differential equation. In analysis mode, the inputs 707 to the reduced order model are a geometry given by a 1D segmented vessel tree extracted by process 610, and boundary conditions on flow and pressure extracted through data assimilation process 308. The reduced order model 706 and inputs 707 produce the desired state of vessel occlusion 708 (anatomical and functional through an FFR calculation, through an iFR calculation, or through a QFR calculation) and a state of microvascular disease. The 1D non-linear theory model 703 is a 1D non-linear Navier-Stokes model, which includes two partial differential equations for mass balance and momentum balance, with unknowns being the flow Q and the cross-sectional average pressure, P.

In an example, the solution to the flow obtained with the 1D non-linear theory model is generated using conversation of mass and momentum of an incompressible Newtonian fluid according to the following system of equations, Equations (3) and (4).

$$\begin{cases} \dfrac{\partial A}{\partial t} + \dfrac{\partial (AU)}{\partial x} = 0 \\ \dfrac{\partial U}{\partial t} + U\dfrac{\partial U}{\partial x} + \dfrac{1}{\rho_f}\dfrac{\partial P}{\partial x} = \dfrac{f}{\rho_f A} \end{cases} \qquad \text{(3) and (4)}$$

where x is the axial coordinate along the vessel, t is the time, A(x,t) is the cross-sectional area of the lumen, U(x,t) is the axial blood flow velocity averaged over the cross-section, P(x,t) is the blood pressure averaged over the cross-section, $\rho_f$ is the density of blood assumed to be constant, and f(x,t) is the frictional force per unit length. The momentum correction factor in the convection acceleration term of Equation (1) can be assumed to be equal to one. Equations (3) and (4) can also be derived by integrating the incompressible Navier-Stokes equations over a generic cross section of a cylindrical domain.

In any event, the flow extraction machine learning models herein may be formed with data-driven algorithms for inferring solutions to these general nonlinear partial differential equations, through physics-informed surrogate classification models. For principled physical laws that govern the time-dependent dynamics of a system, or some empirical validated rules or other domain expertise, information about the physical laws may be used as a regularization agent that constrains the space of admissible solutions to a manageable size. In return, encoding such structured information into a machine learning model results in amplifying the information content of the data that the algorithm sees, enabling it to quickly steer itself towards the right solution and generalize well even when only a few training examples are available. Furthermore, the reduced order models proposed herein will be trained using graph theory and discrepancies between a low fidelity 1D nonlinear model of blood flow and ground truth data given by either 3D high-resolution Navier Stokes models or in-vivo anatomical and hemodynamic data, to accurately and efficiently capture hemodynamics around stenosis. In various examples, of the reduced order model is defined from the graph of discrepancies via one of the following three methods: a) CNN, b) non-local calculus, c) exploration of graphs using transversal algorithms (see, e.g., Banerjee et al., a graph theoretic framework for representation, exploration and analysis on computed states of physical systems, Computer Methods in Applied Mechanics and Engineer, 2019, which is hereby incorporated by reference).

In an example, the flow extraction machine learning model is configured to include hidden fluid mechanics (HFM), a physics informed deep learning framework capable of encoding an class of physical laws governing fluid motions, namely the Navier-Stokes equations, as described in Raissi et al., Hidden Fluid Mechanics, A Navier-Stokes Informed Deep Learning Framework for Assimilating Flow Visualization Data, dated on cover 13 Aug. 2018, herein incorporated by reference. In an example, the flow extraction machine learning model applies the underlying conservation laws (i.e., for mass, momentum, and energy) to infer hidden quantities of interest such as velocity and pressure fields merely from the 3D vessel tree model generated at different times from angiography image data taken at different times. The flow extraction machine learning model may apply an algorithm that is agnostic to the geometry or the initial and boundary conditions. That makes the HFM configuration highly flexible in choosing the types of vessel image data that can be sued for training and for diagnoses by the model. The flow extraction machine learning model is trained to predict pressure and velocity values in both two- and three-dimensional flows of imaged vessels. Such information can be used to determine other physics related properties such as pressure or wall shear stresses in arteries.

Figure 10A:
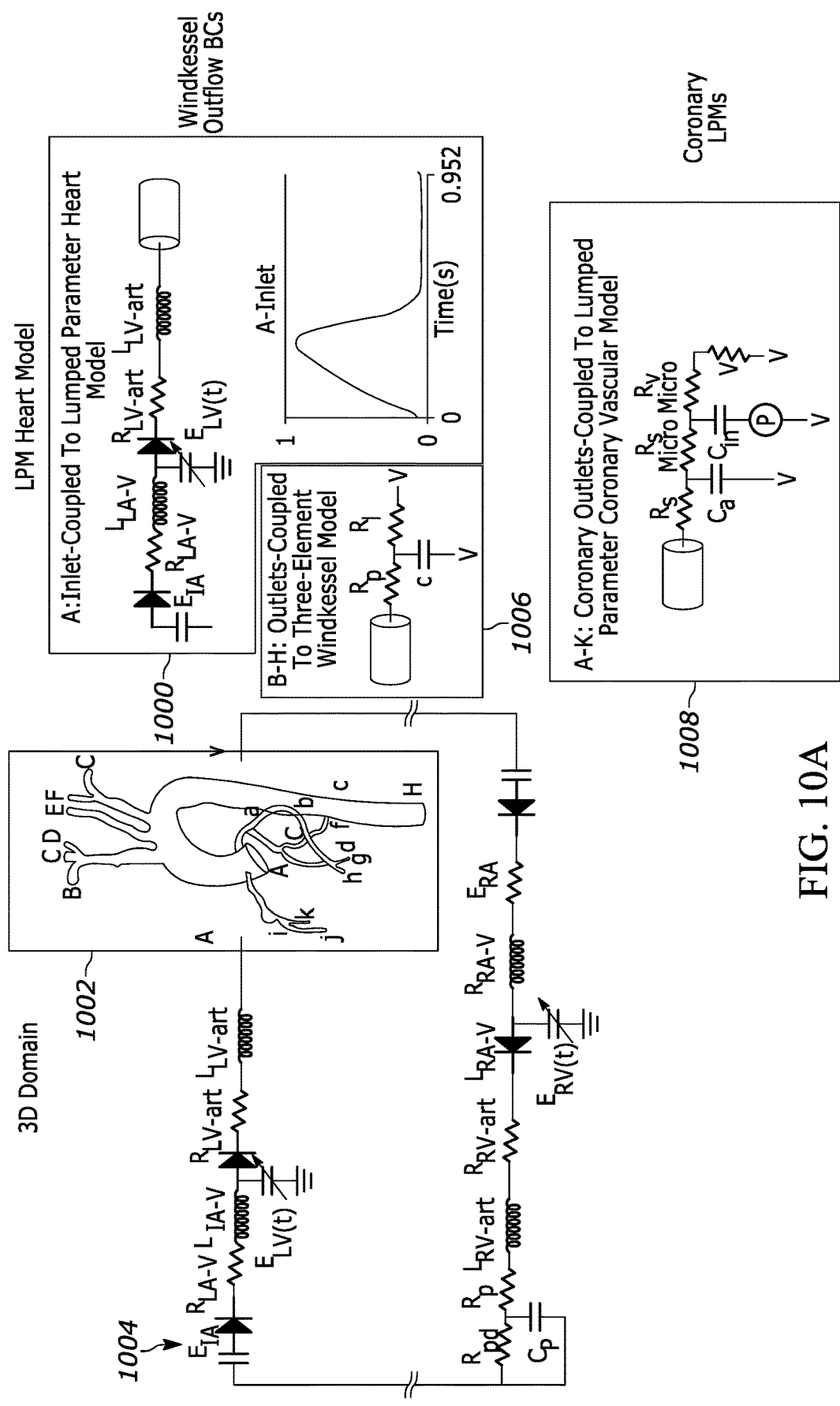
FIGS. 10A and 10B illustrate an example 3D vessel tree model and various lumped parameter models that may be used by a computational fluid dynamics system model for each of those parameters.
Figure 10B:
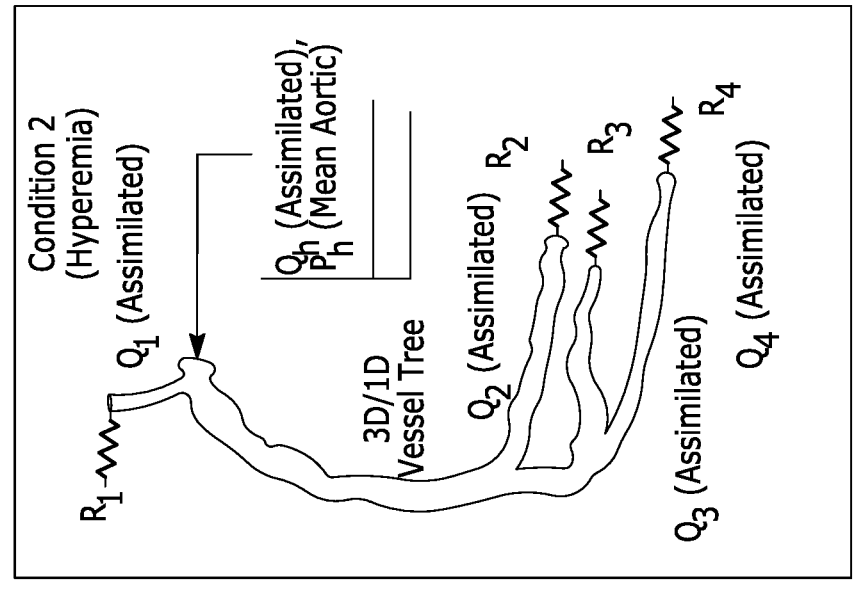
Figure 10B:
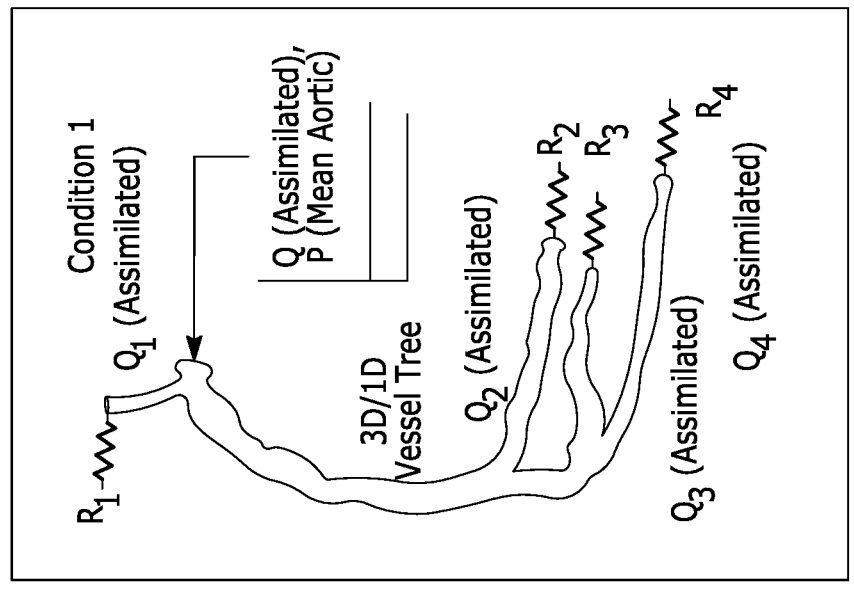
Figure 11A:
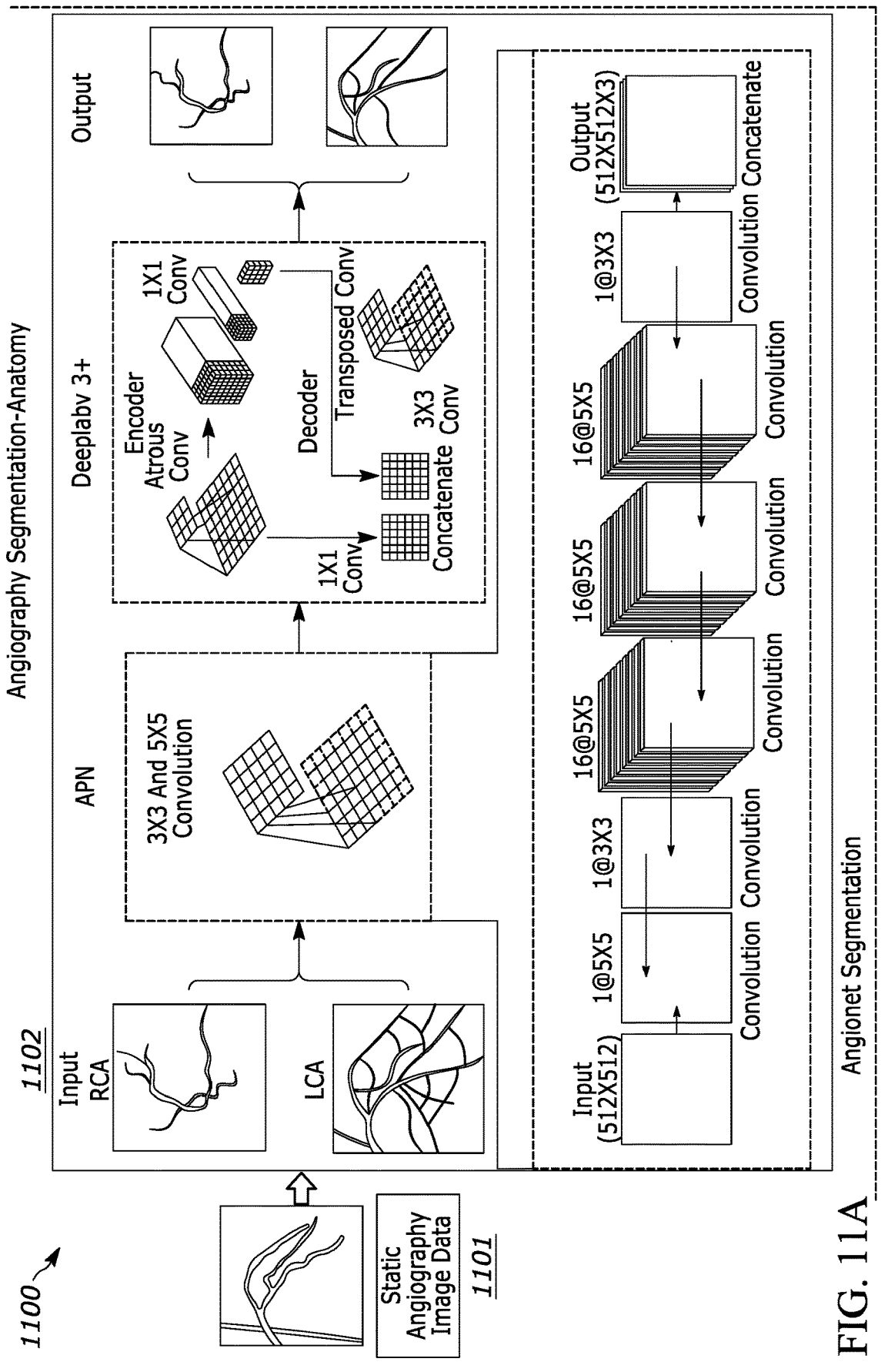
FIGS. 11A-11F collectively illustrate an example workflow of generating anatomical and functional assessment of CAD, in accordance with an example.
Figure 11B:
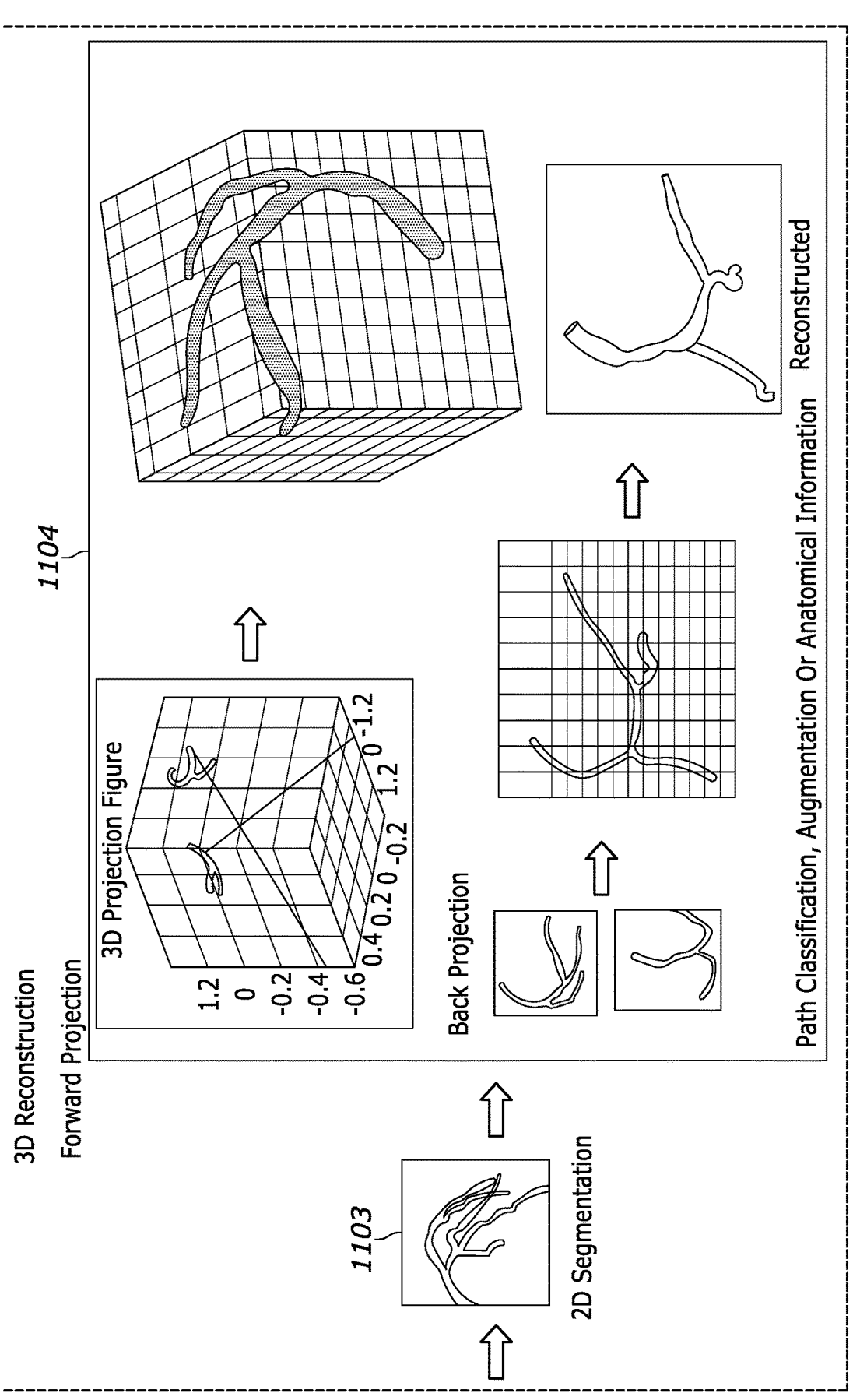
Figure 11C:
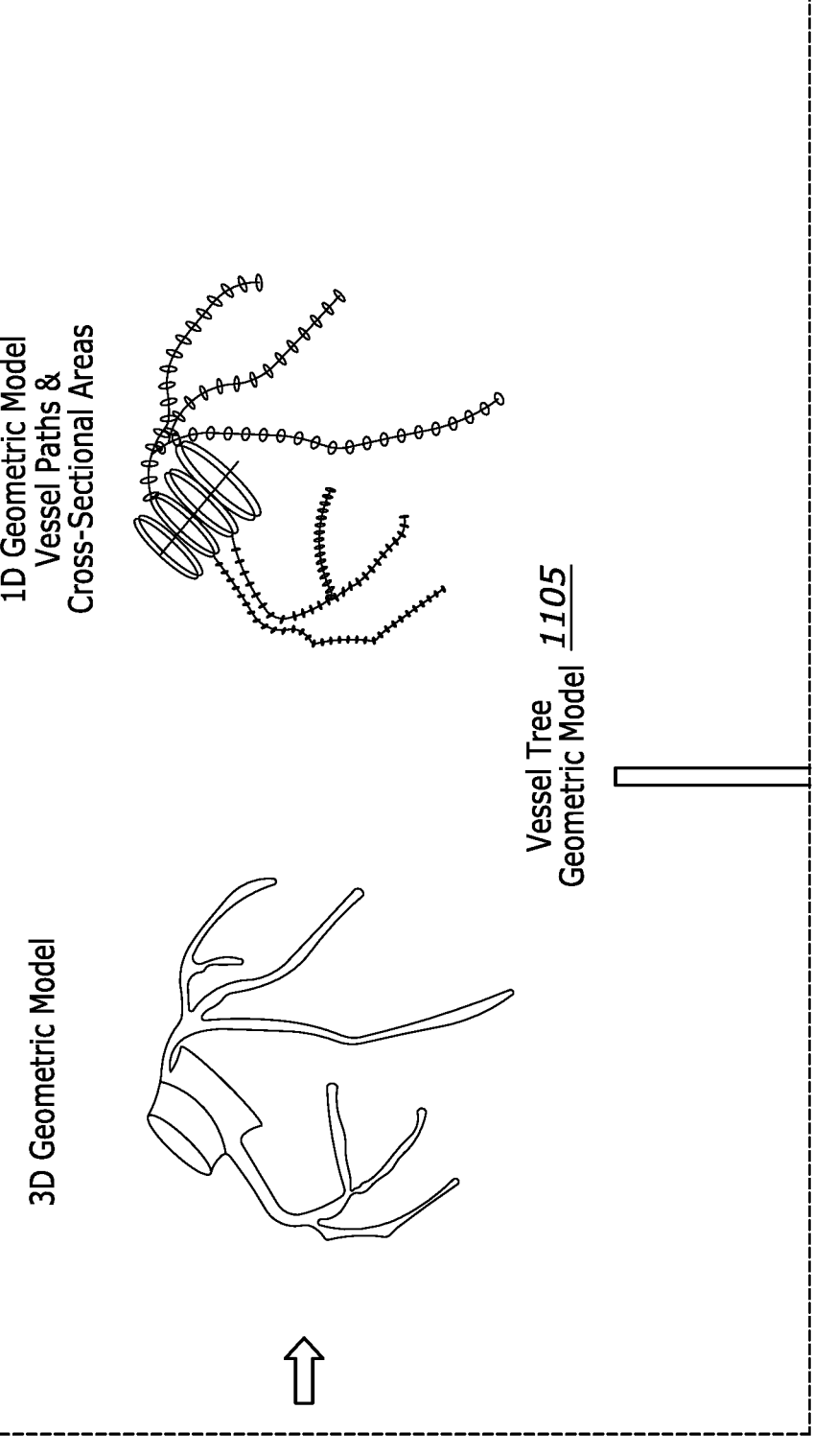
Figure 11D:
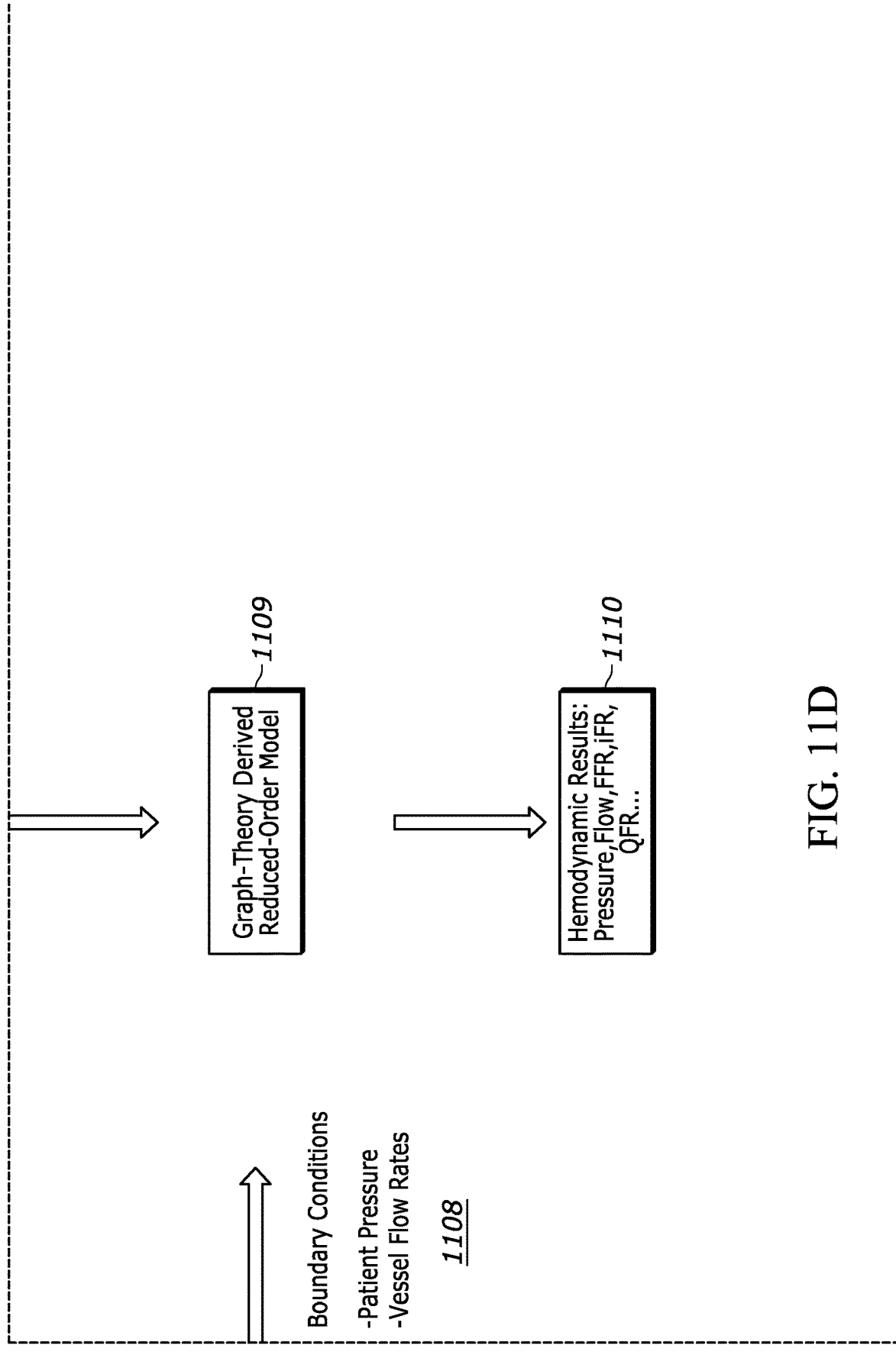
Figure 11E:
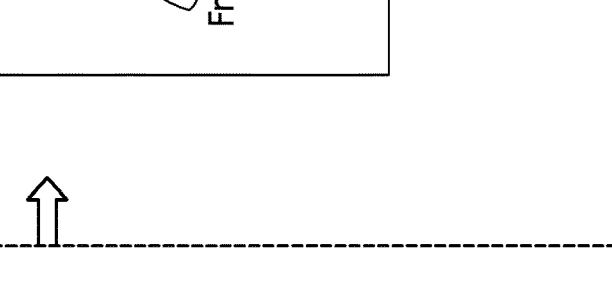
Figure 11F:
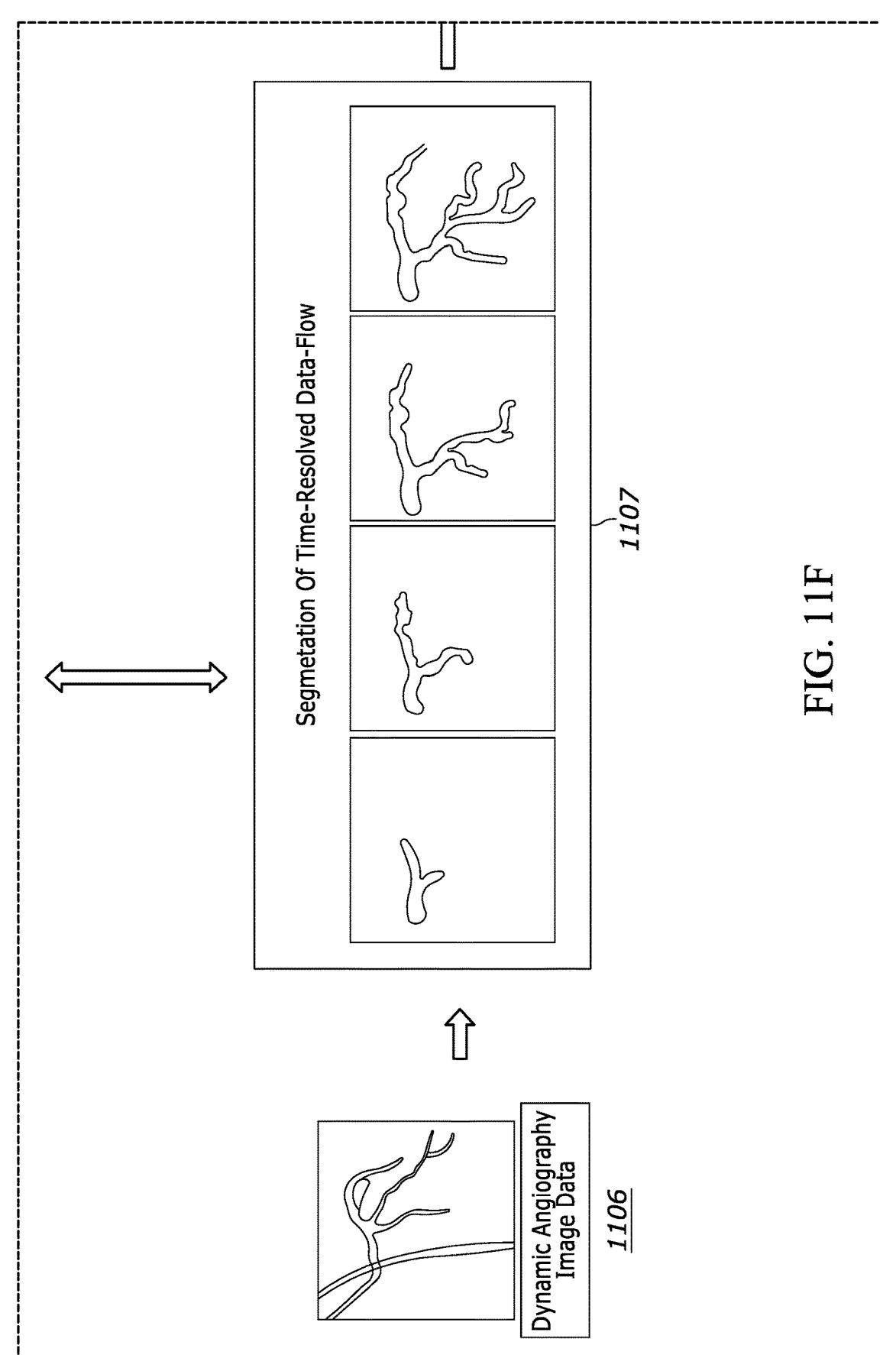

In some examples, the computational fluid dynamics model is configured to determine a lumped parameter model attached to each vessel of the 3D vessel tree model or the 1D vessel tree model. The computational fluid dynamics model may include a series of lumped parameter model (LPM) for different vessels as shown in FIG. 10A. An example LPM 1000 is provided for a heart model coupled to the inflow face of 3D vessel tree 1002. The vessel tree 1002 is formed of multiple different vessels labeled with different letters, A inlet, B-H aortic outlets, and a-k coronary artery outlets. LPM 1006 is used for each of the outlets B-H, representing the microcirculation of vessels other than the coronary arteries. An LPM 1008 is provided for the coronary outlets a-k and is coupled to the LPM 1000 representing the heart. Parameters for this model are estimated from the patient's data on flow and pressure (either measured in the catheterization laboratory or estimated using data assimilation techniques described in 308 or using morphometric considerations such as Murray's Law). A LPM 1004, including both left and right sides of the heart, may be used to run analyses in closed-loop configuration. A model of this nature may be used to calculate hemodynamics under pulsatile conditions. A second example LPM is shown in FIG. 10B. Here, inflow boundary conditions may be defined by either the patient's mean arterial pressure of by a mean flow measured or estimated from the dynamic angiographic data. Patient-specific outflow boundary conditions may be defined by flow down each vessel estimated via the fluid dynamics machine learning process 308 that assimilates flow data over a sampling period, or by LPM (resistors) coupled to each of the outlet faces of the coronary tree. The LPM for each branch of the vessel tree (whether 3D or 1D) may be also estimated once the computed solutions for pressure and flow within the vessel tree are known, assuming a pressure gradient across the LPM down to an fixed level of capillary pressure. A model of this nature may be used to simulate hemodynamics under steady-steady conditions. This process can be repeated for each available hemodynamic state (e.g., baseline and hyperemia). LPMs are used to represent cardiovascular regions where the full detail of the flow solution is not required, but it is important for the model to include the relationship between pressures, flows—and in some cases, volumes—in these regions. They are ideal in regions when detailed spatial information on the vascular geometry is neither available nor of fundamental importance. Their parameters exert a fundamental influence on the pressure and velocity fields in the vessel tree model, and so the parameters must be tuned to achieve physiological values which agree with the data assimilated from the patient images, any additional clinical recordings which are available for the individual in question. When insufficient data is available for parameterization for the specific patient, data from the scientific literature on expected values can be used to assist in determining appropriate parameters.

In an example, the anatomical and functional assessment of CAD follows the workflow 1100 depicted in FIGS. 11A-11F. FIGS. 11A-11F collectively form the workflow 1100, with FIGS. 11A, 11B, and 11C being panels across the upper portion of the workflow 1100, each connecting to the other from left to right, respectively, and with FIGS. 11D, 11E, and 11F being panels across the lower portion of the workflow 1100, each connecting to the other from right to left, respectively, and each connecting to a respective one of FIGS. 11C, 11B, and 11A, respectively. Several angiographic images 1101 taken at different orientations are fed to a machine learning segmentation module 1102 (e.g., corresponding to processes 302, 304, 402, and 404), which automatically produces 2D segmented images of the angiographic images 1103. These images are then fed to an algorithm 1104 that generates 3D and 1D segmented vessel tree models 1105, for example, following a combination of processes given in FIGS. 6A and 6B. This workflow is used to automatically characterize the lumen diameters and therefore anatomical severity of CAD within the vessel inspection region of the angiography image data 1101. Further, a series of angiographic images 1106, defining the transport of the dye down the regions of interest in the vessel tree, are fed to a series of fluid dynamics machine learning algorithms 1107 that assimilate information on blood velocity and/or pressure for each vessel of interest in the vessel tree. This system produces boundary conditions on velocity 1108, which, together with the vessel tree 1105 are fed as inputs for the Graph-theory derived reduced order model 1109, which ultimately produces the desired functional metrics of CAD 1110, including FFR, iFR, QFR and microvascular resistance.

The workflow 1100 includes the machine learning segmentation module 1102 that is provided static angiography image data 1101 and generates a whole 2D segmentation image 1103 of a vessel tree in the vessel inspection region captured in the image data 1101. That 2D segmentation image 1103 is then to a 3D reconstruction process 1104.

In further examples, the processes and workflows herein may be implemented to analyze the angiography image data at an angiogram-level (i.e., whole image level) as described above and at a stenosis-level as described below to generate enhanced 2D vessel segmentation images that may be used for generating 3D and 1D geometric models. With these further examples, 2D segmentation is enhanced with identification of stenosis allowing for enhancement of image data segmentation over a localized region corresponding to the stenosis location (also termed herein "patch") and allowing for determination of degrees of stenosis, stenosis length, etc., at each stenosis location within a vessel inspection region. Analyzing patch images (also termed herein "patches") can allows for more accurate analysis of severe stenosis in a vessel inspection region.

Therefore, present techniques for enhanced 2D segmentation include machine learning pipelines capable of characterizing stenoses in angiography image data. The pipelines include a combination of neural networks and image processing algorithms to automatically localize, segment, and measure stenoses locations within a vessel inspection region and generate 2D segmented images that have been enhanced based on those stenosis locations (e.g. patches). In an example, we compared an example pipeline to ground truth measurements and found that the example pipeline was able to measure stenosis diameter within 0.206±0.155 mm or approximately 1 pixel of ground truth measurements.

FIG. 12 illustrates an example workflow 1200 for generating enhanced 2D segmentation image data for use in determining a state of occlusion within a vessel inspection region, as may be implemented by systems, processes, and workflows herein, such as the CAD assessment system 100 and/or the deep learning framework 200 described above. In particular, the workflow 1200 may be used in place of the workflow 1100 to provide, among other things, stenosis-level analysis of angiography image data allowing for generating 2D segmented images like that of images 1103, but that are enhanced based on localized stenosis analysis, as well as estimation of the state of occlusion via reduced order models derived from multi-fidelity neural network models.

In the illustrated example, angiography image data 1202 containing one or more images of a vessel inspection region are fed to a neural network 2D segmentation module 1204 containing two machine learning pipelines, an angiogram-level segmentation neural network 1206 and a stenosis-level segmentation neural network 1208 that combine to produce enhanced 2D segmentation images 1210 that are fed into a vessel tree reconstruction module 1212. In the illustrated example, the angiography image data 1202 may contain X-ray angiogram images real or synthetic.

The angiogram-level segmentation NN 1206 is a neural network trained to analyze a whole angiography image and generate a 2D segmentation image of a vessel tree within an imaged vessel inspection region. In an example, the angiogram-level segmentation NN 1206 may be implemented by the machine learning segmentation module 1102 (e.g., corresponding to processes in FIGS. 3 and 4 performed by a vessel segmentation machine learning model, as described hereinabove). As such, the angiogram-level segmentation NN 1206 generates a 2D segmentation image. The angiogram-level segmentation NN 1206 may be implemented as an angiography processing network (APN) followed by a semantic segmentation NN (see, e.g., FIG. 4 blocks 402 and 404, and FIG. 5) trained to remove from respective input data image catheters, overlapping bonny structures, and/or other image artifacts, as discussed in other examples herein.

The stenosis-level segmentation NN 1208, by contrast, is trained to receive the angiography image data 1202 and perform stenosis localization and stenosis segmentation to generate segmented patch images corresponding to the stenosis.

Figure 13:
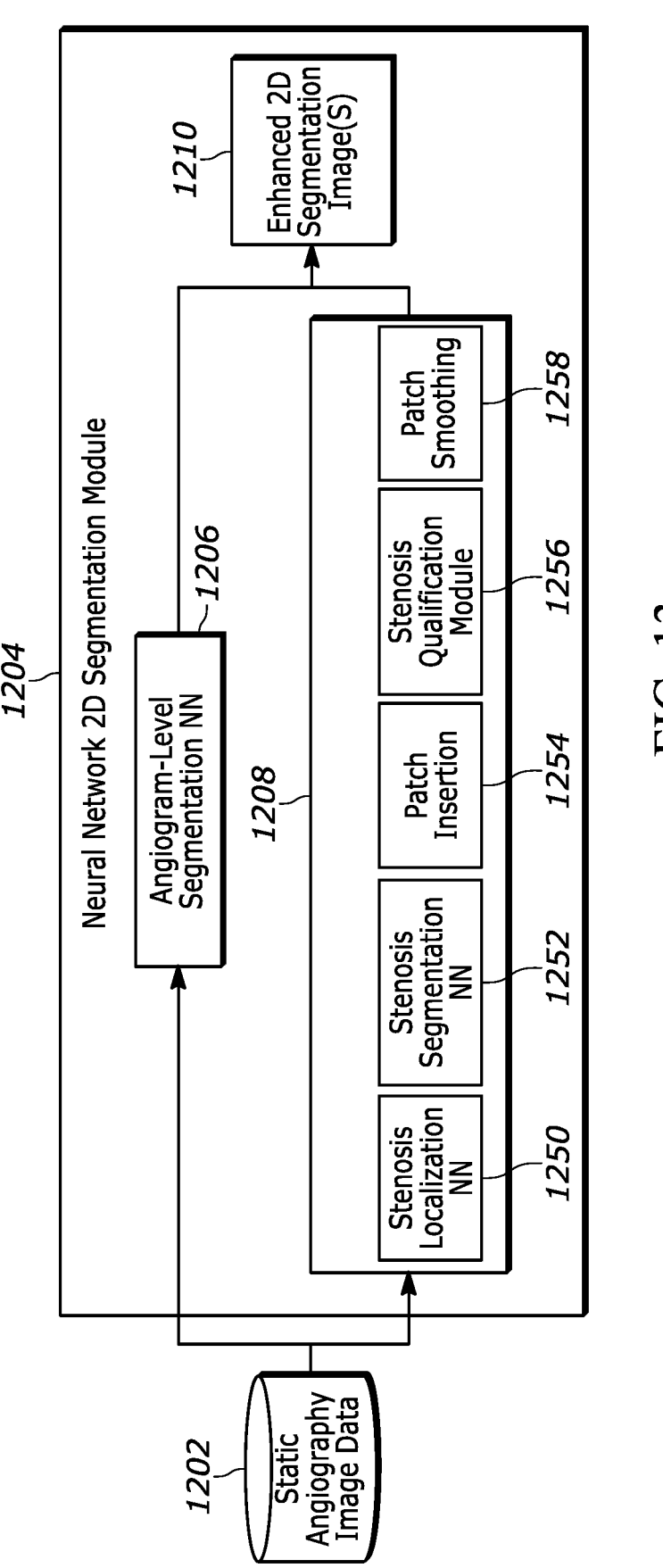
FIG. 13 illustrates an example configuration of an angiogram-level segmentation neural network and stenosis-level vessel segmentation neural network for generating an enhanced 2D segmentation image as may be performed by the workflow of FIG. 12, in accordance with an example.

FIG. 13 illustrates an example implementation of the NN 2D segmentation module 1204. In the illustrated example, the stenosis-level segmentation NN 1208 has a multi-stage machine learning architecture. A first NN stage 1250 is trained to identify stenosis locations in the vessels of the vessel inspection region in the image data 1202. A second NN stage 1252 is trained to perform segmentation on these identified stenosis locations, for example, to binarize the image data of the stenosis location. Similar to 1206, 1102, 503 & 507, 402 & 404, the NN stage 1252 is comprised of 2 stages: an APN followed by a semantic segmentation NN.

In the illustrated example, NN stage 1250 is an object-detector, such as a YOLOv5 neural network. The YOLOv5 architecture can offer near-real time inference speed and better performance at detecting small objects compared to other state of the art object detection networks. However, it will be appreciated that any number of neural network architectures may be used.

The NN stage 1252 may be trained to perform segmentation for a specified area corresponding to the stenosis identified at the NN stage 1250. For example, the NN stage 1252 may be a patch-level trained NN that performs segmentation of the patch image centered around the stenosis location. The NN stage 1252 may contain an APN followed by a semantic segmentation NN, such as VGG UNet or Deeplabv3.

The stenosis-level segmentation NN 1208 further includes a patch insertion stage 1254, a stenosis quantification module stage 1256, and a patch smoothing stage 1258. That is, in some examples, the stenosis-level segmentation NN 1208 is a module that contains NN stages and non-machine learning stages. Although in some examples, the stenosis-level segmentation NN may be trained to with layers to perform the processes of stages 1254-1258 described herein.

Figure 14:
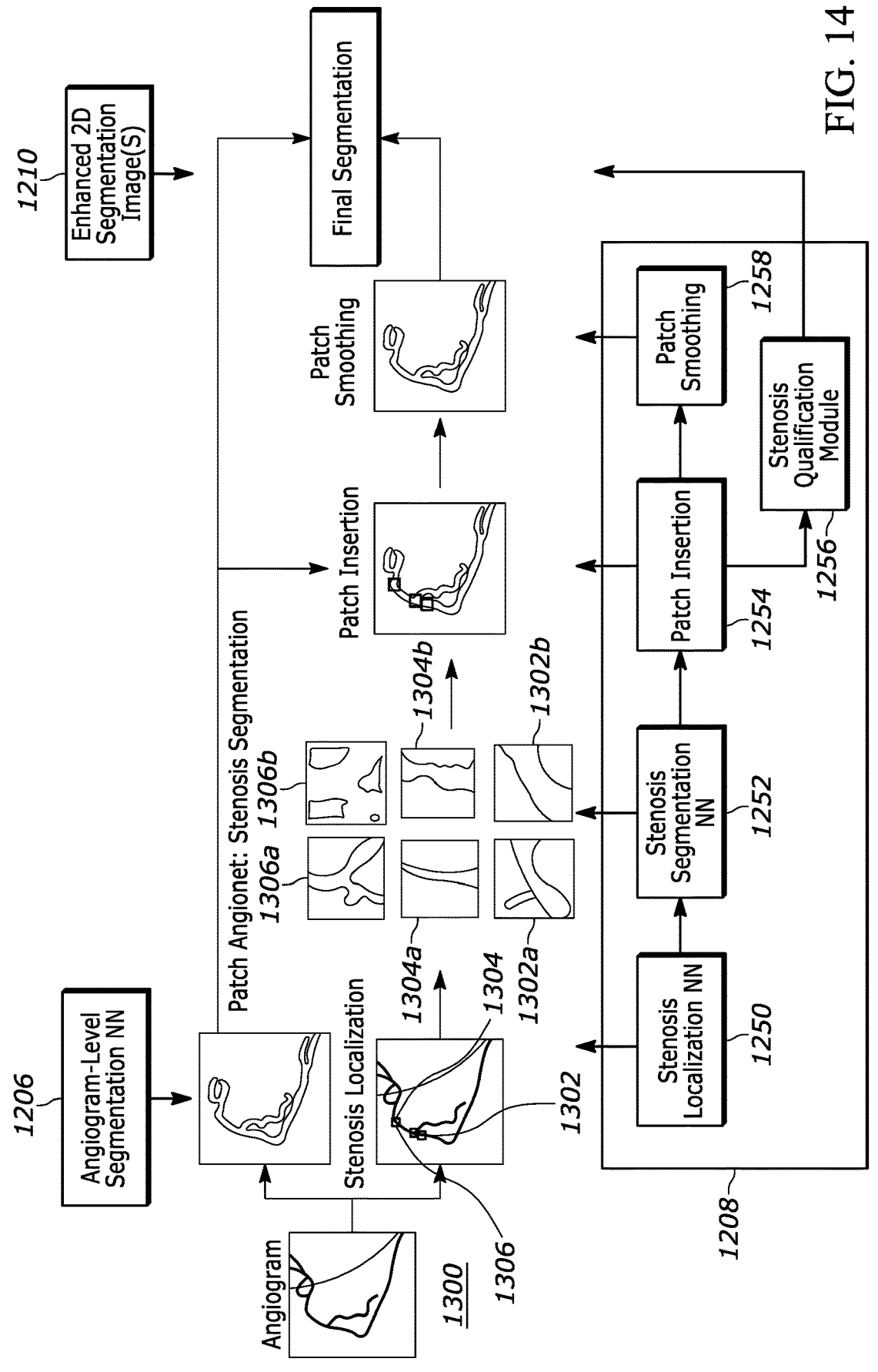
FIG. 14 illustrates an example operation of the angiogram-level segmentation neural network and the stenosis-level vessel segmentation neural network of FIG. 13, in accordance with an example.

FIG. 14 illustrates an example operation of the NN 2D segmentation module 1204, which includes the angiogram-level segmentation NN 1206, and the stenosis-level segmentation NN 1208 (consisting of stages: stenosis localization NN 1250, stenosis segmentation NN 1252, patch insertion 1254, stenosis quantification 1256, and patch smoothing 1258). The stenosis localization NN stage 1250 has identified three regions of stenosis 1302, 1304, 1306 in the received angiography image data 1300. Depending on the training of the machine learning model, the regions of stenosis may be actual regions of stenosis or candidate regions of stenosis that may include actual and potential regions of stenosis. The later allows for using a downstream process to subsequently determine which of the candidate regions of stenosis are actual regions of stenosis. In the illustrated example, the NN stage 1250 identifies stenosis locations over the entire image data and thus over an entire vessel inspection region. In the illustrated example, the NN stage 1250 identifies the location of each stenosis by their centroids (e.g., an X and Y coordinate of the angiography image data 1300). Subsequently to that identification, a patch image centered at that centroid may be generated, either by the NN stage 1250 or by a subsequent process not shown. For example, a patch image of 40×40 pixels may be generated centered at each centroid (X,Y), resulting in the patch images 1302*a*, 1304*a*, 1306*a* corresponding to stenosis locations 1302, 1304, 1306, respectively.

Each of the patch images 1302*a*, 1304*a*, 1306*a* is fed to the stenosis segmentation NN stage 1252 which generates segmented patch images 1302*b*, 1304*b*, 1306*b*, respectively. That is, the stenosis segmentation NN stage may be trained to segment a patch image formed of a reduced set of pixels from the image 1300, and centered at the centroid (X,Y), defining the stenosis location. These generated segmented patch images are then provided to the patch insertion stage 1254.

A patch insertion stage 1254 may perform a stitching process by taking the segmented patch images and stitching them into the 2D segmented image generated by the angiogram-level segmentation NN 1206.

Figure 15:
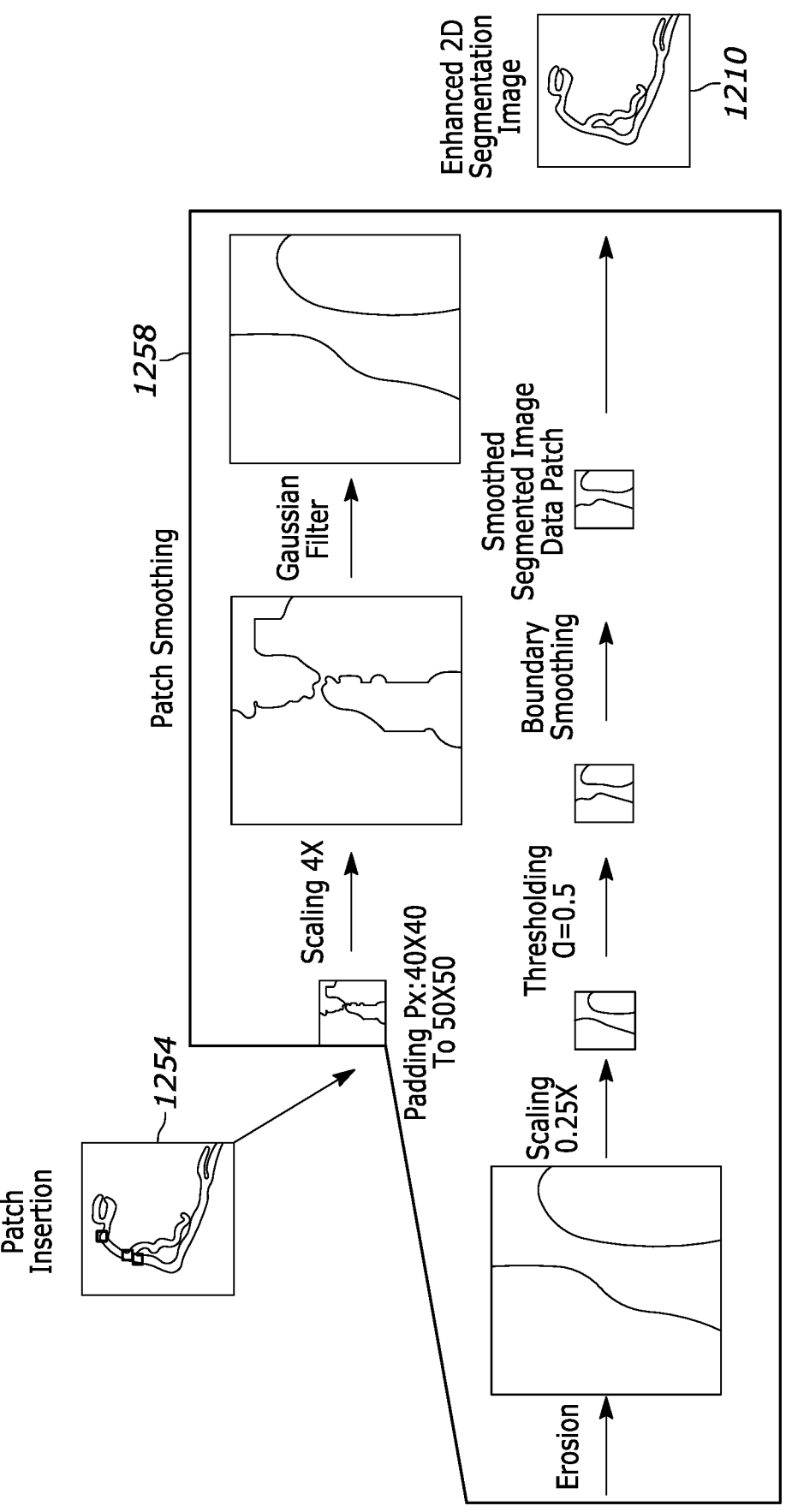
FIG. 15 illustrates an example of patch smoothing imaging processing that may be performed prior to patch stitching or after patch stitching as may be performed by the example operation of FIG. 14, in accordance with an example.

The stitching of the stage 1254 may be performed based on the centroid coordinates defining the stenosis location from the stage 1250. In some examples, a patch smoothing stage (1258) performs image alignment between vessel structure (edges, etc.) in the segmented patch image and the adjacent regions thereto in the 2D segmented image from the angiogram-level segmentation NN 1206. In yet further examples, the patch smoothing stage 1258 may apply image processing to smooth the segmented image patch and its transition between the adjacent regions. By way of example, the patch smoothing stage 1258 may perform a smoothing process that includes a padding process, an upscaling process, a Gaussian filter process, an erosion process, a downscaling process, a thresholding process, and/or a boundary smoothing process based on linear interpolation and a Savitzky-Golay filter. The end result is the enhanced 2D segmentation image 1210. FIG. 15 illustrates example smoothing operations and an example ordering thereof that have been applied to a 40×40 pixel patch image that has been padded up to a 50×50 pixel patch image for smoothing processing. Padding, while optional, may allow for better control over the smoothing operation on the inserted patches.

Returning to FIG. 14, the stenosis quantification module 1256 may determine a degree of stenosis, a length of stenosis, or other quantities such as stenosis eccentricity, for each of the identified stenosis regions 1302, 1304, 1306. In the illustrated, stenosis-level segmentation NN 1208 is configured with the module 1256 receiving patch images from the patch insertion stage 1254. In other examples, the module 1256 may receive patch images directly from the NN stage 1252 or from the patch smoothing stage 1258 after a smoothing operation has been performed. In some examples, the module 1256 may be configured to determine a stenosis diameter and/or percent diameter reduction for each stenosis location (e.g., for example patch image). A comparison of the diameter of the segmentation at the stenosis location to diameters at a portion of the vessel proximally or distally to the stenosis location provides a degree of stenosis for the stenosis location. The diameters and these different locations may be determined by counting pixels from vessel edge to vessel edge of the segmented images at the corresponding location. In addition to determining the degree of stenosis, the stenosis quantification module 1256 may determine the length of the stenosis for each stenosis location. For example, the module 1256 may determine the diameter at various points (or continuously) along an axial direction of the vessel and compare these diameters identifying those within a percentage range, standard deviation, or other statistical metric as corresponding to a stenosis or as corresponding to a non-stenosis portion of the vessel. The quantified data (e.g., degree of stenosis and length of stenosis) may then be stored as metadata within the enhanced 2D segmented image 1210, for use in generating the 3D/1D geometric tree models. It will be appreciated that any number of image processing techniques (including techniques other than pixel counting based techniques) can be used to determine the degree of stenosis, length of stenosis, or other metrics such as eccentricity. As noted above, the stenosis quantification module 1256 may be performed on the patch image before the patch image is stitched into the 2D segmentation image. The stenosis quantification may occur after stitching. The stenosis quantification may occur after patching stitching and the smoothing operation.

In an example implementation, the stenosis quantification module 1256 may use image processing algorithms to measure stenosis diameter and quantify percent diameter reduction. For example, a Euclidean distance transform may be performed to create a distance map. A skeletonization algorithm may then be applied to identify the vessel centerline in the patch image. From there, the radii along the vessel segment may be determined by sampling the Euclidean distance map at the locations of the centerline pixels. The pixel diameters may then be converted to millimeters via a calibration factor, derived from the width of a reference structure, such as a 6F catheter, or the metadata of the angiographic images 1300. A signal processing algorithm may be then applied to the list of radii to identify the peaks (diameters proximal and distal to the stenosis) and troughs (lesion diameter), from which the percent stenosis was calculated as:

$$\% \text{ stenosis}=1-(\text{lesion diameter})/(0.5*(\text{proximal diameter}+\text{distal diameter})),$$

where the reference diameter was the average of the diameters proximal and distal to the stenosis.

Returning to FIG. 12, in some examples, the input angiography image data may be provided to an image standardization process (not shown) before being provided to the neural network 2D segmentation module 1204. Or the module 1204 may be configured to perform a standardization process. The standardization process may standardize image characteristics, such as intensity, contrast, etc. For example, the angiography image data may be standardized using z-score normalization to increase robustness of the neural network to images from different datasets, where the distribution of pixel intensities may not match that of the training dataset. In an example implementation of the stenosis localization neural network 1250, the training dataset was composed of 974 angiography images with annotations corresponding to each stenosis. Cardiologists manually generated annotations by selecting the centroid of each stenosis in each angiography image. The centroid coordinate was then used to define the center of a bounding box, which encompasses the stenosis, using fixed parameters for width and height. Each bounding box annotation was defined by its normalized coordinates (centroid X, centroid Y, width, height). In some examples, the bounding box dimensions were fixed at 40×40 pixels. In other examples, the bounding box dimensions may be fixed at 64×64 pixels, 32×32 pixels, or any other combination of dimensions. 779 angiography images were used for training the network and 195 angiography images were used for validation, corresponding to an 80/20 train-validation split.

In this example implementation, transfer learning was employed. The YOLOv5 network architecture for the NN stage 1250 was initialized with pre-trained weights from the database ImageNet (https://www.image-net.org/) and trained for 300 epochs using an ADAM optimizer with a learning rate of 1e-3. The loss function was a combination of binary cross entropy loss and focal loss, which measured how well the network predicted bounding boxes in the correct locations and classified them as stenoses. The output of the stenosis localization NN 1250 were the normalized coordinates of a bounding box (centroid X, centroid Y, width, height) which identifies the location of each stenosis from an input angiography image. The normalized coordinates of the bounding boxes were then used to crop the input angiographic image into patches which are centered at each identified stenosis. Patches were then used for further analysis, for example, the patches may be fed into the stenosis segmentation neural network 1252.

In an example implementation of the stenosis segmentation neural network 1252, the training dataset was composed of 965 patches cropped from angiographic images. Each patch was cropped based on the centroid coordinates of an identified stenosis. In some examples, stenoses can be identified manually by cardiologists. In other examples, stenoses may be identified using image processing or a neural network, one example being the stenosis localization neural network 1250. Each patch was accompanied by a corresponding annotation. Annotations were manually generated by labelling each patch pixel as either a vessel pixel (white) or a background pixel (black). In some examples, the patches and annotations were both 40×40 pixels. It can be appreciated that any N×N dimension (where N is the number of pixels) of patch and annotation can be used to train the network as long as the patch and annotation have the exact same dimension. 687 annotations were used for training the network and 278 annotations were used for validation. In this example implementation, the segmentation network was composed of an APN and a U-Net backbone with a VGG-19 encoder. It can be appreciated that the APN could be replaced by other pre-processing functions or networks such as a pixel intensity normalization process or manual parameters for contrast enhancement and boundary sharpening. It can also be appreciated that the U-Net can also be replaced by other semantic segmentation networks such as DeeplabV3+, etc. The stenosis segmentation network was trained for 400 epochs with a learning rate of 1e-4 and an ADAM optimizer. A weight decay (L2) regularization was imposed with a coefficient of 1e-3 during the training process. The loss function was a weighted average of Tversky loss and centerline-Dice loss. The output of the stenosis segmentation neural network 1252 is an N×N segmented image patch with vessel pixels labelled in white and background pixels labelled in black. The segmented image patches were then used for further analysis, for example, the patches may be fed into a patch insertion script 1254, a patch smoothing script 1258, or a stenosis quantification module 1256.

Figure 16:
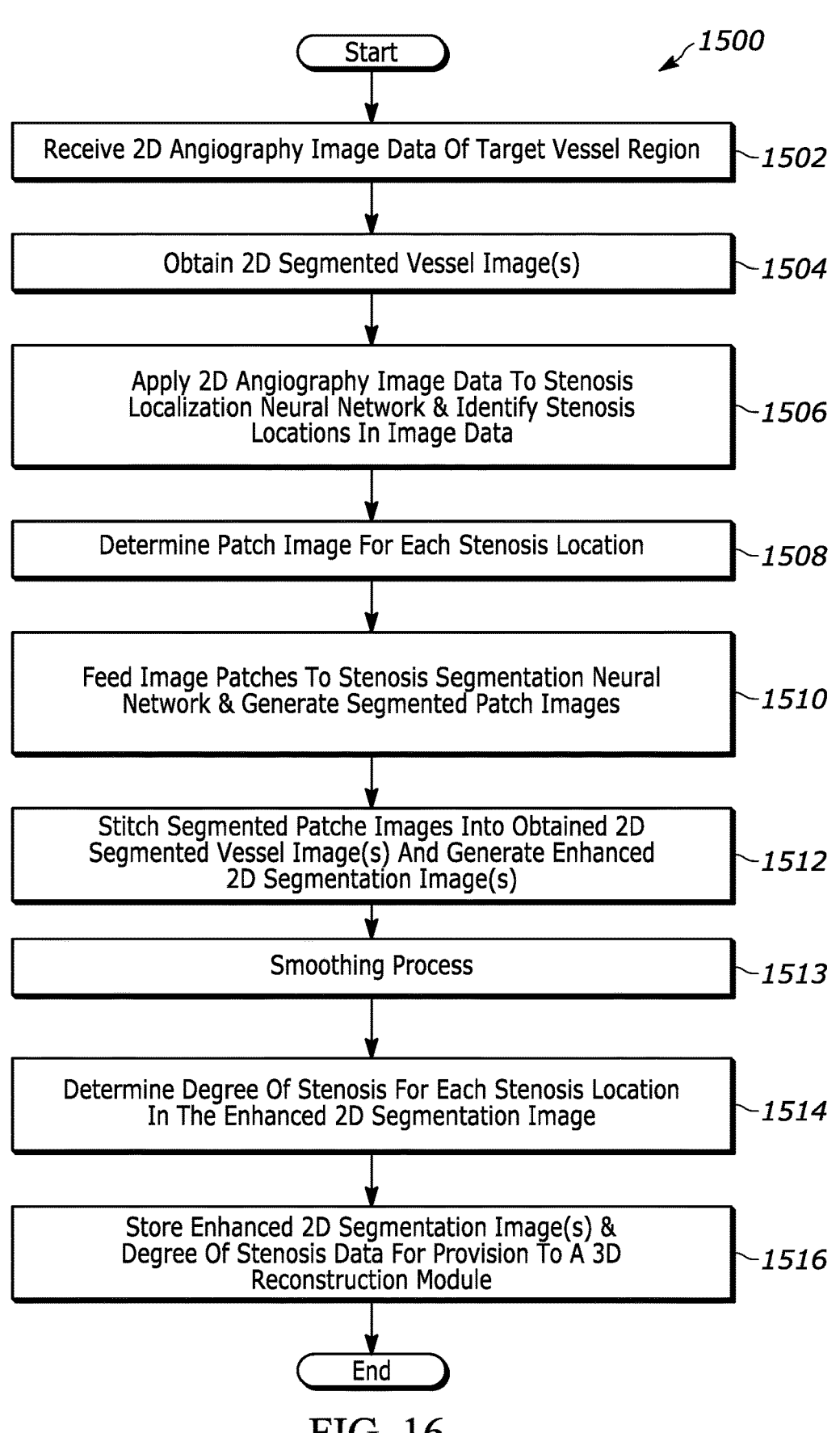
FIG. 16 is a process flow diagram of a method of generating enhanced 2D segmentation images for use in determining a state of occlusion within a vessel inspection region as may be performed by the workflow in FIG. 12, in accordance with an example.

FIG. 16 illustrates an example process 1500 for generating enhanced 2D segmentation images for use in determining a state of occlusion within a vessel inspection region as may be performed by the workflow 1204. At a block 1502, 2D angiography image data of a vessel inspection region is obtained, and, at a block 1504, one or more 2D segmentation vessel images are generated from that 2D angiography image data. The block 1504 may execute processes described herein, such as the processes in FIGS. 3, 4, and 5 or any known techniques for generating 2D segmentation images. That is, irrespective of the technique for generating 2D segmented vessel images, the stenosis-level enhancements of the process 1500 may be applied to any 2D segmentation image. At a block 1506, the received 2D angiography image data from block 1502 is provided to a stenosis localization neural network trained to identify stenosis locations within a vessel inspection region. In the illustrated example, the block 1506 is performed via a neural network which identifies the centroid coordinates of a stenosis. For each of those identified stenoses, block 1508 crops the original angiography image data using the stenosis centroid coordinates into an N×N pixel patch image. The patch images from block 1508 are fed to a block 1510 where a stenosis segmentation neural network segments each patch image. The segmented patch images from block 1510 are then stitched into the 2D segmentation image(s) from block 1504, at a block 1512. The stitched 2D segmentation images are then subjected to a smoothing process block 1513 that smooths the segmented patch image and aligns the segmented patch image with the 2D segmentation image to form an enhanced 2D segmentation image. At block 1514, the degree of stenosis, stenosis length, or other relevant measurements such as stenosis eccentricity are determined for each stenosis location in the enhanced 2D segmentation image. In some examples, block 1514 may be applied to the segmented patch image prior to smoothing. The stenosis locations from block 1506, enhanced 2D segmentation image from block 1513, and the stenosis measurements from block 1514 may then be stored at a block 1516, for example, for use in generating a three-dimensional (3D) vessel tree model.

Returning to FIG. 12, the enhanced 2D segmentation images 1210 may be generated for angiography images that were captured from different clinical projection angles, for example with RAO/CRA, LAO/CAU, RAO/AP, or other angulations. Two or more enhanced 2D segmentation images 1210 from different projection angles may then be provided to a vessel tree reconstruction module 1212. Using this input, the vessel tree reconstruction module reconstructs a 3D and/or 1D geometric model of a vessel tree. The module 1212 may be a 3D reconstruction process 1104 shown in FIG. 11B or the 3D modeler 208 and 1D modeler 209 shown in FIG. 2. In some examples, the module 1212 reconstructs a 3D (and/or optionally 1D) vessel tree geometric model according to any of the process flows described in FIGS. 6A and 6B. In yet other examples, the module 1212 may be a machine learning module trained to reconstruct a 3D vessel tree model. Examples machine learning modules include convolutional neural networks such as ResNet101 or Inception v3, etc.

The workflow 1200 also determines functional data for the entire vessel tree or for each branch of vessel tree in the vessel inspection region, in particular flow data, by analyzing the dynamic angiography image data 1202. The image data 1202 may contain angiography images captured at different times during injection and flow of a dye through the vessel inspection region (e.g., as dynamic angiography image data). The dynamic image data 1202 is fed to a flow data generator 1216 that may be implemented by a series of image processing or machine learning algorithms, such as those in 1107 in FIGS. 11E and 11F. In some examples, the flow data generator 1216 may be configured as a physics-informed deep learning framework or a TIMI frame counter configured to count the number of frames between key anatomical landmarks. In another example, the automated flow extractor can apply a series of image processing techniques to calculate flow through a vessel of interest.

Figure 17A:
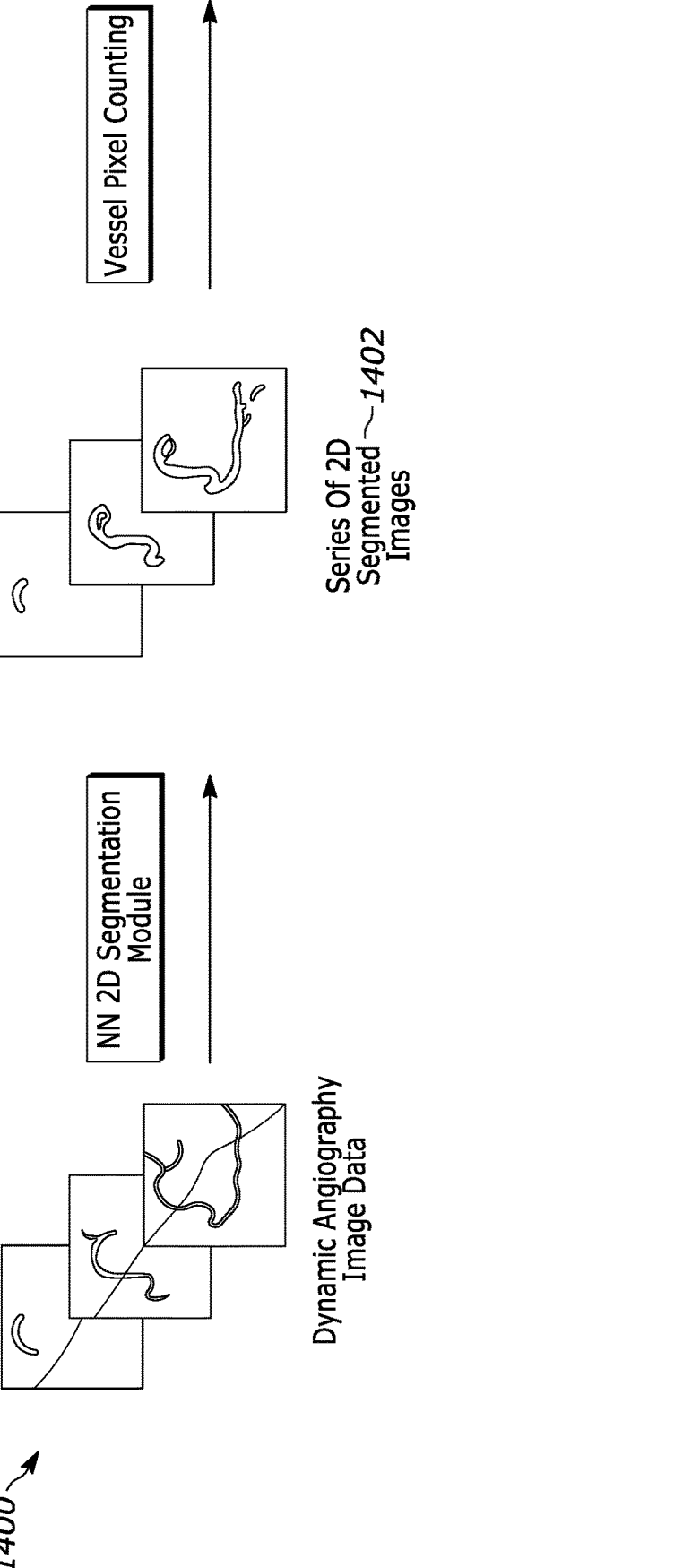
FIGS. 17A and 17B collectively illustrate an example process to extract flow data through an entire vessel tree or a single branch of interest, as may be performed by a flow data generator, in accordance with an example.
Figure 17B:
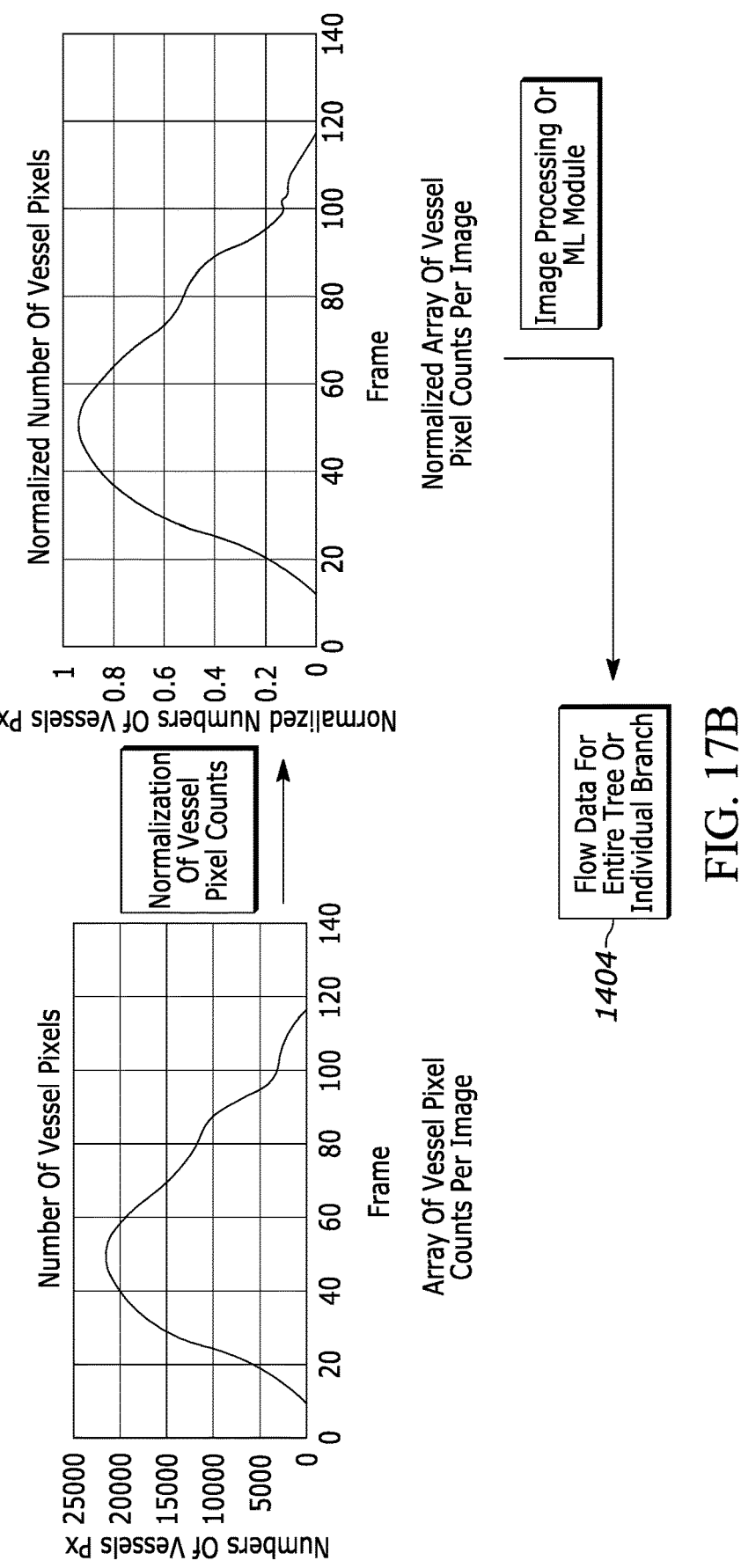

FIGS. 17A and 17B combine to illustrate an example process 1400 to extract flow data through an entire vessel tree or a single branch of interest, as may be performed by the flow data generator 1216. The NN 2D-segmentation module 1204 is first applied to every angiographic image in the dynamic image data 1202 to obtain a series of 2D segmented images 1402. It can be appreciated that the series of 2D segmented images 1402 may be subjected to pre-processing techniques such as cropping or removal of small branches. Second, in each 2D segmented image, the number of vessel pixels (white) is counted to generate an array of vessel pixel counts per image 1402. Third, the array of vessel pixel counts per image 1402 is divided by its maximum value to generate a normalized array of vessel pixel counts 1402. Fourth, an image processing or machine learning module is then applied on either the array of vessel pixel counts per image 1402 or the normalized array of vessel pixel counts per image 1402 to extract the flow data for an entire tree or an individual branch 1404. This module may include, but is not limited to, smoothing of high-frequency noise in the vessel pixel counts using an exponential moving window or low-pass filter, converting pixel values to units of length, converting frames to units of time, estimating the radii along vessel centerlines using Euclidean distance transforms and medial axis skeletonizations, filtering out heart motion, deformable body registration, calibrating extracted flow data to account for injection timing during the cardiac cycle, obtaining parameters defining the exponential ascend and descend of the corresponding parts of the array of pixel counts, etc.

The flow data generator 1216 outputs the flow data. Boundary conditions for the computational fluid dynamics machine learning module 1218 are defined by the output of the flow data generator 1216 and by patient pressure data 1215. The computational fluid dynamics machine learning module 1218 generates state of occlusion data 1222 for the vessel inspection region, such as flow and pressure estimates, FFR, other metrics such as iFR, QFR, indices of microvascular resistance, etc. In some instances, the computational fluid dynamics machine learning model 1218 may be a reduced order model (ROM), such as a graph theory informed or other ROM 213 in FIG. 2. In FIG. 12, the ROM is given by a multi-fidelity neural network model 1220 and not a graph theory informed model. The multi-fidelity NN ROM 1220 is obtained using models of different fidelities, such as low-fidelity 0D or 1D model and a high-fidelity 3D Navier Stokes or ground truth data such as invasive FFR, to combine the computational efficiency of a low-fidelity model with the accuracy of a high-fidelity model.

Figure 18A:
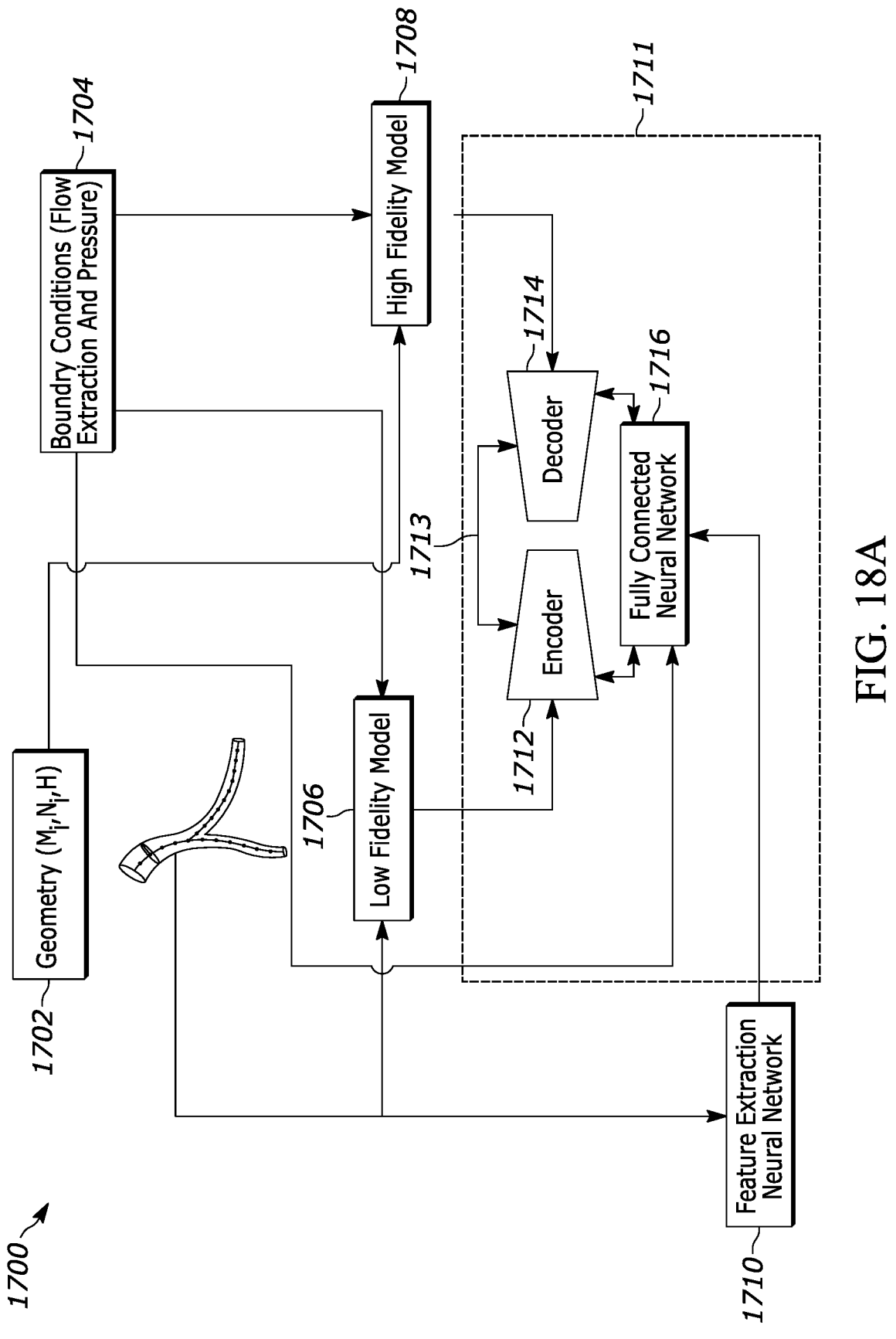
FIGS. 18A and 18B illustrate an example architecture of a multi-fidelity neural network in a training mode (FIG. 18A) and a production model (FIG. 18B), in accordance with an example.

In an example implementation of the multi-fidelity NN model 1220, a training mode 1700 (see, FIG. 18A) includes the following: 1) input of a 3D (i.e., high fidelity) and 1D (i.e., low fidelity) representation 1702 of a vessel tree given by the vessel tree reconstruction module 1212; 2) boundary conditions 1704, given by the output of the flow data generator 1216 (e.g., the assimilated flow), and the patient pressure 1215; 3) a low-fidelity model (LFM) 1706 representing the physics of flow and pressure in each vessel tree (a feature of this low-fidelity model 1706 is its computational efficiency); 4) a high-fidelity model (HFM) 1708 representing the physics of flow and pressure in each vessel tree (a feature of this high-fidelity model is its accuracy); 5) a feature extraction machine learning method (e.g., implemented by a feature extraction neural network 1710) to obtain a lower-rank representation of the geometry of the vessel trees; and 6) a machine learning method (e.g., implemented by a multi-fidelity neural network 1711) to establish relationships between the low-fidelity model and the high-fidelity model and their corresponding representation of the physics of flow and pressure in each vessel tree. Training of the multi-fidelity NN may be done against a large number of synthetic ground truth data given by high-fidelity CFD simulations of flow and pressure though stenosed vessels, stenosed vessel tress, and ground truth data on FFR, iFR, QFR, or other relevant metrics of stenosis severity.

In some examples, the low-fidelity model 1706 includes a model of pressure drop through each stenosis in the vessel tree. That model of pressure drop may include an order reduction of the 3-D Navier-Stokes equations using assumptions of steady-state, axi-symmetry, and incompressibility, along with variable separation of the axial velocity. The model of pressure drop describes the pressure drop dP/dz as a function of flow, Q, and vessel geometry R(z). This model may contain several terms, some of which have tunable coefficients which can be adjusted using data. An example of such dP/dz function is given by:

$$\frac{dP}{dz} = \frac{2}{\pi^2} \frac{\rho Q^2}{R^5} \frac{dR}{dz} \gamma_1 - \frac{\mu Q}{\pi R^4} \gamma_2 + \frac{6\mu Q}{\pi R^4} \left(\frac{dR}{dz}\right)^2 - \frac{2\mu Q}{\pi R^3} \frac{d^2 R}{dz^2},$$

where $\gamma_1$ and $\gamma_2$ are tunable coefficients.

In some examples, the model of pressure drop through the stenosis may be obtained via a tensor basis reduction for the axial velocity. This model is also a function of the flow Q and vessel geometry R(z). The model has tunable coefficients $a_{ij}$ that adjust to the complexity of the available data (i,j=1, . . . N).

$$\left( \frac{dP}{dz} = 2\rho \sum_{ijkl} a_{ij} a_{kl} \frac{j+l}{i+k+2} z^{j+l+1} + \frac{2\mu}{R^2} \sum_{ij} a_{ij} i z^j + \frac{\mu Q}{\pi} \frac{d^2}{dz^2} \left(\frac{1}{R^2}\right) \frac{dP}{dz} = \right.$$

$$\left. 2\rho \sum_{ijkl} a_{ij} a_{kl} \frac{j+l}{i+k+2} z^{j+l+1} + \frac{2\mu}{R^2} \sum_{ij} a_{ij} i z^j + \frac{\mu Q}{\pi} \frac{d^2}{dz^2} \left(\frac{1}{R^2}\right) \right)$$

In some examples, the feature extraction machine learning method is a convolutional neural network (FENN) 1710, such as an autoencoder for dimensionality reduction. This autoencoder contains an encoder to compress the input geometry for each vessel tree to latent space features, which provide a low-rank representation of the input geometry for each vessel tree. The autoencoder contains a decoder to recover the input geometry for each vessel tree from the latent space features. The autoencoder is trained to learn geometry features of the vessel tree, such as number of branches, number of stenoses, stenosis severity, distribution of branch diameters, etc. The autoencoder is trained to maximize the attention to the stenosis region.

In some examples, the machine learning method to establish relationships between the low- and high-fidelity models, is a multi-fidelity neural network 1711 consisting of the following components: 1) an encoder 1712 to compress hemodynamic data from the low-fidelity model 1706 to low-fidelity feature maps in the latent space; 2) a decoder 1714 to reconstruct the hemodynamic data for the high-fidelity model (e.g., the 3D representation) from high-fidelity feature maps in the latent space; 3) a fully connected neural network (FCNN) 1716 between the encoder 1712 and the decoder 1714 to map the relationship between low-fidelity and high-fidelity feature maps in latent space; 4) skip connections 1713 (only one shown, but multiple connections may exist) between the encoder 1712 and the decoder 1714 to enhance the relationship between high-fidelity and low-fidelity feature maps.

In some examples, the inputs of the fully connected neural network are: 1) the geometric features learned by the feature extraction neural network (FENN) 1710; and 2) low-fidelity feature maps in the latent space. Similarly, the outputs of the fully connected neural network may be the high-fidelity feature maps.

Figure 18B:
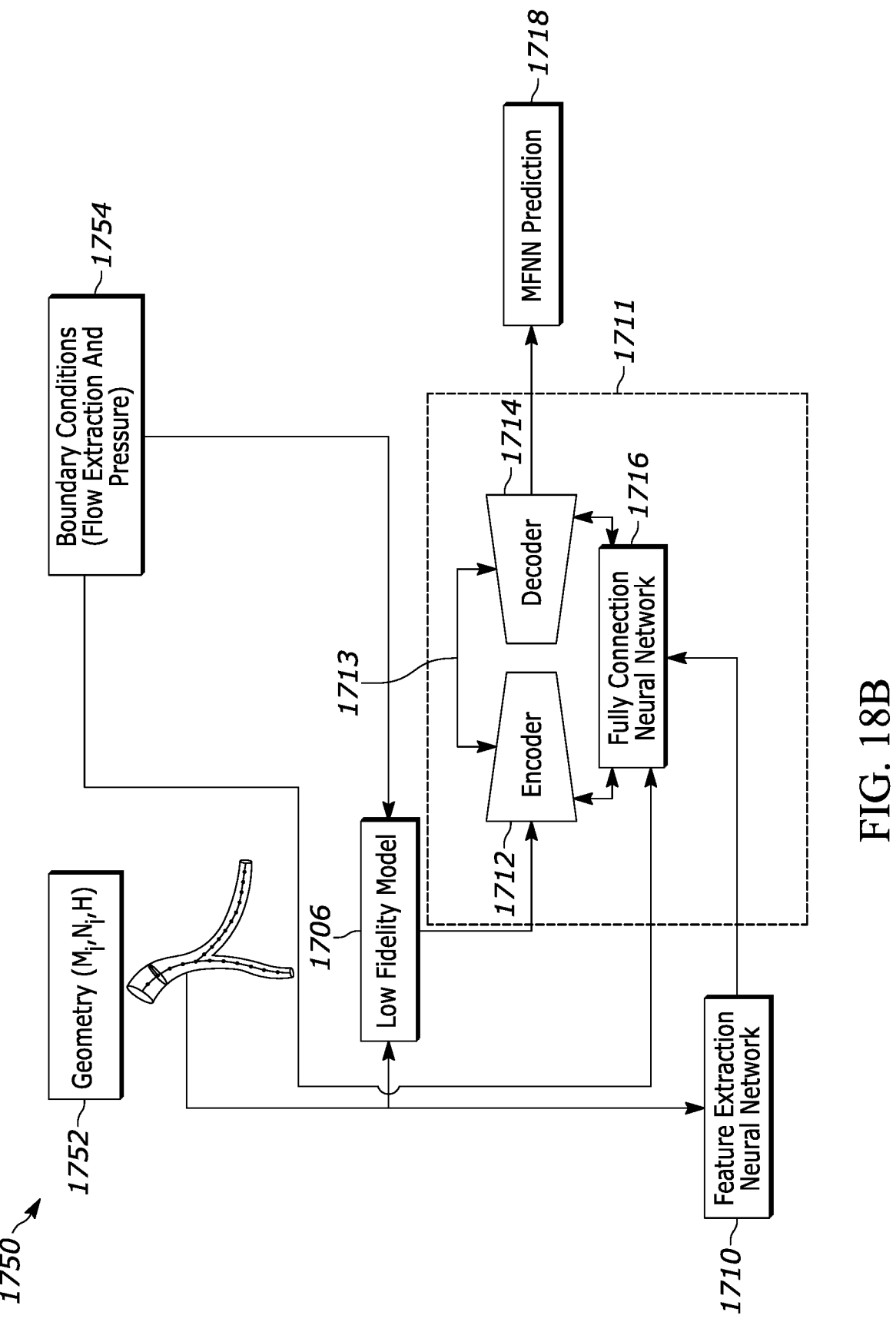

In an example implementation of the multi-fidelity NN 1220, a production mode 1750 (FIG. 18B) includes the following: 1) receiving a 3D (i.e., high fidelity) and 1D (i.e., low fidelity) representation 1752 of a vessel tree given by the vessel tree reconstruction module 1212; 2) receiving boundary conditions 1754, given by the output of the flow data generator 1216 (e.g., the assimilated flow), and the patient pressure 1215; 3) a low-fidelity model (LFM) 1706 representing the physics of flow and pressure in each vessel tree; 4) the trained feature extraction neural network 1710 to obtain a lower-rank representation of the geometry of the vessel trees; and 5) the trained the multi-fidelity neural network 1711 to represent the physics of flow and pressure in each vessel tree.

In this example production mode, the output data (labeled 1718) of the multi-fidelity NN 1711 may be the state of occlusion data 1222 for the vessel inspection region, such as flow and pressure estimates, FFR, other metrics such as iFR, QFR, indices of microvascular resistance, etc.

Figure 19:
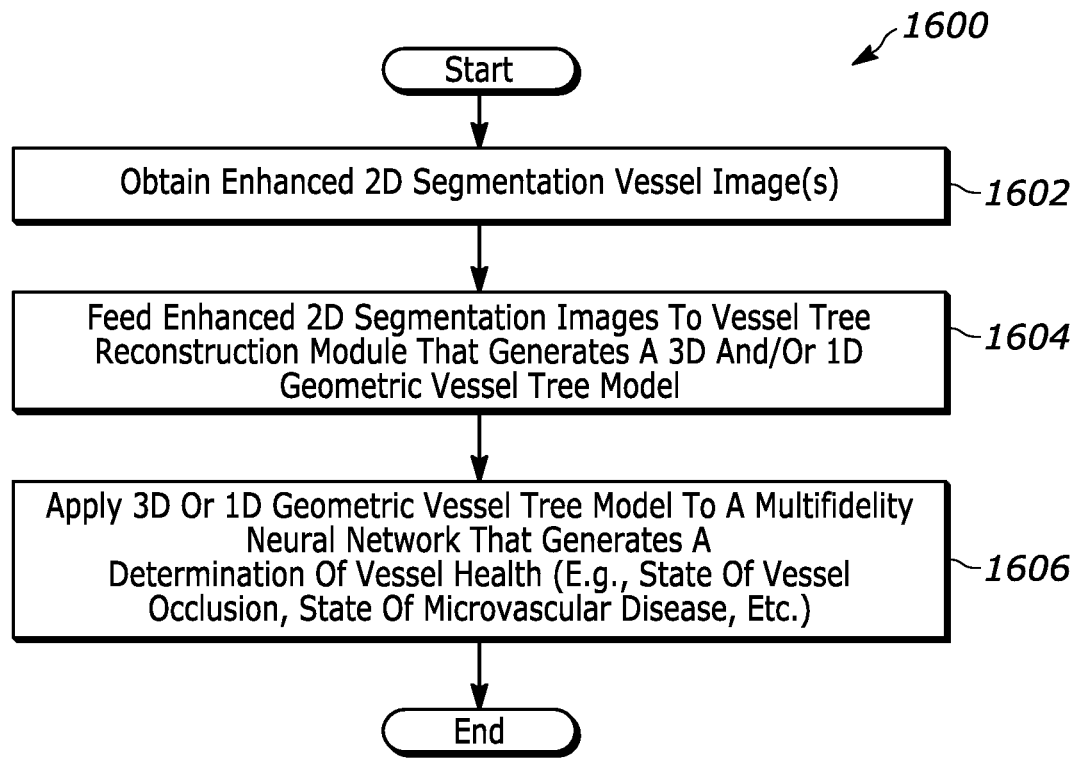
FIG. 19 is a process flow diagram of a method for analyzing vessel health by determining a state of occlusion over a vessel inspection region, using a multi-fidelity neural network, in accordance with an example.

FIG. 19 illustrates an example process 1600 for analyzing vessel health by determining a state of occlusion over a vessel inspection region, using a multi-fidelity neural network. At block 1602, enhanced 2D segmentation images are obtained, for example, from the process 1500. At a block 1604, these enhanced 2D segmentation images are fed to a vessel tree reconstruction module that generates a 3D and/or 1D geometric vessel tree model. At a block 1606, the 3D and/or 1D model then is provided to a multi-fidelity reduced order model that generates a determination of vessel health, such as determining a state of occlusion or state of microvascular disease over a vessel inspection region.

Additional Aspects

Aspect 1. A computer-implemented method for generating enhanced segmentation images for use in determining a state of occlusion within a vessel inspection region, the method comprising: receiving, by one or more processors, angiography image data of a vessel inspection region containing a vessel tree, the angiography image data comprising one or more two-dimensional (2D) angiography images; applying, by the one or more processors, the angiography image data to an angiogram-level vessel segmentation machine learning model trained to generate a segmented image of the vessel tree; applying, by the one or more processors, the angiography image data to a stenosis machine learning model trained to identify and segment stenoses within the vessel tree to generate segmented patch images; determining, by the one or more processes, a degree of stenosis for each segmented patch image within a vessel tree; stitching, by the one or more processors, each segmented patch image into the segmented image of the vessel tree to form an enhanced segmentation image of the vessel tree; and storing the enhanced segmentation image and the determined degree of stenosis for each stenosis, for use in reconstructing a three-dimensional (3D) vessel tree model, performing flow extraction, and determining a state of occlusion in the vessel inspection region.

Aspect 2. The computer-implemented method of Aspect 1, wherein the angiogram-level vessel segmentation machine learning model is a convolutional neural network.

Aspect 3. The computer-implemented method of Aspect 2, wherein the convolution neural network has an APN pre-processing neural network and a Deeplabv3+ architecture.

Aspect 4. The computer-implemented method of Aspect 1, wherein the stenosis machine learning model comprises a stenosis localization machine learning model trained to identify stenosis locations within the vessel tree and a stenosis segmentation machine learning model trained to generate segmented patch images corresponding to each identified stenosis.

Aspect 5. The computer-implemented method of Aspect 4, wherein the stenosis localization machine learning model is a first convolutional neural network and wherein the stenosis segmentation machine learning model is a second convolutional neural network.

Aspect 6. The computer-implemented method of Aspect 5, wherein the first convolutional neural network is an object-detector.

Aspect 7. The computer-implemented method of Aspect 5, wherein the second convolution neural network has an APN pre-processing network and a VGG U-Net architecture.

Aspect 8. The computer-implemented method of Aspect 1, wherein the angiogram-level vessel segmentation machine learning model and the stenosis machine learning model each have an angiography processing network (APN) trained to remove from respective input data image catheters, overlapping bonny structures, and/or other image artifacts.

Aspect 9. The computer-implemented method of Aspect 4, wherein the stenosis localization machine learning model is trained to identify centroid coordinates for each stenosis in angiography image data.

Aspect 10. The computer-implemented method of Aspect 4, wherein the stenosis segmentation machine learning model is trained to generate a segmented patch image by classifying vessel and background pixels in a cropped patch image of the angiography image data.

Aspect 11. The computer-implemented method of Aspect 10, wherein the cropped patch image of the angiography image data is given by centroid coordinate of an identified stenosis and an N×N pixel dimension.

Aspect 12. The computer-implemented method of Aspect 1, wherein stitching each generated segmented patch image into the segmented image comprises an insertion and a smoothing process.

Aspect 13. The computer-implemented method of Aspect 12, wherein the insertion process comprises inserting the segmented patch image into the segmented image using centroid coordinates for an identified stenosis.

Aspect 14. The computer-implemented method of Aspect 12, wherein the smoothing process comprises, by the one or more processors, performing a padding process, an upscaling process, a Gaussian filter process, an erosion process, a downscaling process, a thresholding process, and/or a boundary smoothing process based on linear interpolation and a Savitzky-Golay filter.

Aspect 15. The computer-implemented method of Aspect 1, comprising, determining the degree of stenosis for each stenosis location in each segmented patch image.

Aspect 16. The computer-implemented method of Aspect 15, wherein the degree of stenosis determined for each segmented patch image comprises percentage of stenosis data, stenosis length data, and stenosis eccentricity data.

Aspect 17. The computer-implemented method of Aspect 1, further comprising: feeding the enhanced segmentation image to a vessel tree geometric model constructor; and generating, in the vessel tree geometric model constructor, a segmented geometric vessel tree model.

Aspect 18. The computer-implemented method of Aspect 17, wherein the segmented geometric vessel tree model is a 3D model.

Aspect 19. The computer-implemented method of Aspect 17, wherein segmented geometric vessel tree geometric model is a 1D model.

Aspect 20. The computer-implemented method of Aspect 1, wherein the angiography image data comprises dynamic angiography images corresponding to a progression of fluid flow within the vessel tree, the method further comprising: applying the dynamic angiography images to a flow data generator configured to extract flow data for the vessel tree; and applying the segmented geometric vessel tree model, the extracted flow data, and the pressure data, to a reduced order model (ROM) configured to determine the state of occlusion in the vessel inspection region.

Aspect 21. The computer-implemented method of Aspect 20, wherein the ROM for determining the state of occlusion in the vessel inspection region is a multi-fidelity neural network, configured to: receive, by one or more processors, the segmented geometric vessel tree model represented by a matrix $Mi \times Ni \times 4$, where Mi is the number of branches in the vessel tree i, Ni is the number of points on each branch centerline, and 4 is the data encoded in each point of the branch centerline, specifically its three-dimensional coordinates (x,y,z) and radius r; using a feature extraction machine learning method, obtain a lower-rank representation of the geometry of the segmented geometric vessel tree model; using a low-fidelity model, represent physics of flow and pressure in each vessel tree; using a high-fidelity model, represent physics of flow and pressure in each vessel tree; and using a machine learning method, establish relationships between the low-fidelity model and the high-fidelity model and their corresponding representation of the physics of flow and pressure in each vessel tree.

Aspect 22. the computer-implemented method of Aspect 21, wherein the feature extraction machine learning model is a convolutional neural network (FECNN).

Aspect 23. The computer-implemented method of Aspect 22, wherein the convolutional neural network is an autoencoder for dimensionality reduction.

Aspect 24. The computer-implemented method of Aspect 23, wherein the autoencoder contains an encoder to compress the input geometry for each vessel tree to latent space features, which provide a low-rank representation of the input geometry for each vessel tree.

Aspect 25. The computer-implemented method of Aspect 23, wherein the autoencoder contains a decoder to recover the input geometry for each vessel tree i from the latent space features.

Aspect 26. The computer-implemented method of Aspect 23, wherein the autoencoder is trained to learn geometry features of the vessel tree i, such as number of branches Mi, number of stenoses, stenosis severity, distribution of branch diameters, etc.

Aspect 27. The computer-implemented method of Aspect 21, wherein the low-fidelity model is given by either a lumped-parameter model, a 1-D linear model of the Navier-Stokes equations, a 1-D non-linear model of the Navier-Stokes, or a coarse-grid 3-D Navier-Stokes model.

Aspect 28. The computer-implemented method of Aspect 27, wherein the low-fidelity model includes a model of pressure drop through each stenosis in the vessel tree.

Aspect 29. The computer-implemented method of Aspect 28, wherein the model of pressure drop through the stenosis is obtained via order reduction of the 3-D Navier-Stokes equations using assumptions of steady-state, axi-symmetry, and incompressibility, along with variable separation of the axial velocity.

Aspect 30. The computer-implemented method of Aspect 28, wherein the model of pressure drop through the stenosis is obtained via a tensor basis reduction for the axial velocity.

Aspect 31. The computer-implemented method of Aspect 21, wherein the high-fidelity model is given by either a fine-grid 3-D Navier-Stokes model of pressure and flow, or an invasive FFR assessment for each vessel tree.

Aspect 32. The computer-implemented method of Aspect 21, wherein the machine learning method to establish relationships between the low-fidelity and high-fidelity models is a multi-fidelity neural network.

Aspect 33. The computer-implemented method of Aspect 32, wherein the multi-fidelity neural network consists of the following components: an encoder to compress hemodynamic data from the low-fidelity model to low-fidelity feature maps in the latent space; a decoder to reconstruct the hemodynamic data for the high-fidelity model from high-fidelity feature maps in the latent space; a fully connected neural network to map the relationship between low-fidelity and high-fidelity feature maps in latent space; and skip connections between encoder and decoder to enhance the relationship between high-fidelity and low-fidelity feature maps.

Aspect 34. The computer-implemented method of Aspect 33, wherein the inputs of the fully-connected neural network are: geometric features learned by the computer-implemented method of Aspect 3; and the low-fidelity feature maps.

Aspect 35. The computer-implemented method of Aspect 33, wherein the outputs of the fully-connected neural network are: the high-fidelity feature maps.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the target matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion such as a Contrast Agent Injection System shown in FIG. 2) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding; and no unnecessary limitations should be understood therefrom, as modifications within the scope of the invention may be apparent to those having ordinary skill in the art.

What is claimed:

1. A computer-implemented method for generating enhanced segmentation images for use in determining a state of occlusion within a vessel inspection region, the method comprising:

receiving, by one or more processors, angiography image data of a vessel inspection region containing a vessel tree, the angiography image data comprising one or more two-dimensional (2D) angiography images;

applying, by the one or more processors, the angiography image data to an angiogram-level vessel segmentation machine learning model trained to generate a segmented image of the vessel tree;

applying, by the one or more processors, the angiography image data to a stenosis machine learning model trained to identify and segment stenoses within the vessel tree to generate segmented patch images;

determining, by the one or more processes, a degree of stenosis for each segmented patch image within a vessel tree;

stitching, by the one or more processors, each segmented patch image into the segmented image of the vessel tree to form an enhanced segmentation image of the vessel tree; and storing the enhanced segmentation image and the determined degree of stenosis for each stenosis, for use in reconstructing a three-dimensional (3D) vessel tree model, performing flow extraction, and determining a state of occlusion in the vessel inspection region.

2. The computer-implemented method of claim 1, wherein the angiogram-level vessel segmentation machine learning model is a convolutional neural network.

3. The computer-implemented method of claim 2, wherein the convolution neural network has an APN pre-processing neural network and a Deeplabv3+ architecture.

4. The computer-implemented method of claim 1, wherein the stenosis machine learning model comprises a stenosis localization machine learning model trained to identify stenosis locations within the vessel tree and a stenosis segmentation machine learning model trained to generate segmented patch images corresponding to each identified stenosis.

5. The computer-implemented method of claim 4, wherein the stenosis localization machine learning model is a first convolutional neural network and wherein the stenosis segmentation machine learning model is a second convolutional neural network.

6. The computer-implemented method of claim 5, wherein the first convolutional neural network is an object-detector.

7. The computer-implemented method of claim 5, wherein the second convolution neural network has an APN pre-processing network and a VGG U-Net architecture.

8. The computer-implemented method of claim 1, wherein the angiogram-level vessel segmentation machine learning model and the stenosis machine learning model each have an angiography processing network (APN) trained to remove from respective input data image catheters, overlapping bony structures, and/or other image artifacts.

9. The computer-implemented method of claim 4, wherein the stenosis localization machine learning model is trained to identify centroid coordinates for each stenosis in angiography image data.

10. The computer-implemented method of claim 4, wherein the stenosis segmentation machine learning model is trained to generate a segmented patch image by classifying vessel and background pixels in a cropped patch image of the angiography image data.

11. The computer-implemented method of claim 10, wherein the cropped patch image of the angiography image data is given by centroid coordinate of an identified stenosis and an N×N pixel dimension.

12. The computer-implemented method of claim 1, wherein stitching each generated segmented patch image into the segmented image comprises an insertion and a smoothing process.

13. The computer-implemented method of claim 12, wherein the insertion process comprises inserting the segmented patch image into the segmented image using centroid coordinates for an identified stenosis.

14. The computer-implemented method of claim 12, wherein the smoothing process comprises, by the one or more processors, performing a padding process, an upscaling process, a Gaussian filter process, an erosion process, a downscaling process, a thresholding process, and/or a boundary smoothing process based on linear interpolation and a Savitzky-Golay filter.

15. The computer-implemented method of claim 1, comprising the determination of the degree of stenosis for each stenosis location in each segmented patch image.

16. The computer-implemented method of claim 15, wherein the degree of stenosis determined for each segmented patch image comprises percentage of stenosis data, stenosis length data, and stenosis eccentricity data.

17. The computer-implemented method of claim 1, further comprising:

feeding the enhanced segmentation image to a vessel tree geometric model constructor; and generating, in the vessel tree geometric model constructor, a segmented geometric vessel tree model.

18. The computer-implemented method of claim 17, wherein the segmented geometric vessel tree model is a 3D model.

19. The computer-implemented method of claim 17, wherein segmented geometric vessel tree geometric model is a 1D model.

20. The computer-implemented method of claim 1, wherein the angiography image data comprises dynamic angiography images corresponding to a progression of fluid flow within the vessel tree, the method further comprising:

applying the dynamic angiography images to a flow data generator configured to extract flow data for the vessel tree; and applying a segmented geometric vessel tree model generated by a vessel tree geometric model constructor, the extracted flow data, and pressure data obtained from a patient, to a reduced order model (ROM) configured to determine the state of occlusion in the vessel inspection region.

21. The computer-implemented method of claim 20, wherein the ROM for determining the state of occlusion in the vessel inspection region is a multi-fidelity neural network, configured to:

receive, by one or more processors, the segmented geometric vessel tree model represented by a matrix Mi×Ni×4, where Mi is the number of branches in the vessel tree i, Ni is the number of points on each branch centerline, and 4 is the data encoded in each point of the branch centerline, specifically its three-dimensional coordinates (x,y,z) and radius r;

using a feature extraction machine learning method, obtain a lower-rank representation of the geometry of the segmented geometric vessel tree model;

using a low-fidelity model, represent physics of flow and pressure in each vessel tree;

using a high-fidelity model, represent physics of flow and pressure in each vessel tree; and using a machine learning method, establish relationships between the low-fidelity model and the high-fidelity model and their corresponding representation of the physics of flow and pressure in each vessel tree.

22. The computer-implemented method of claim 21, wherein the feature extraction machine learning model is a convolutional neural network (FECNN).

23. The computer-implemented method of claim 22, wherein the convolutional neural network is an autoencoder for dimensionality reduction.

24. The computer-implemented method of claim 23, wherein the autoencoder contains an encoder to compress the input geometry for each vessel tree to latent space features, which provide a low-rank representation of the input geometry for each vessel tree.

25. The computer-implemented method of claim 23, wherein the autoencoder contains a decoder to recover the input geometry for each vessel tree i from the latent space features.

26. The computer-implemented method of claim 23, wherein the autoencoder is trained to learn geometry features of the vessel tree, i, including number of branches, $M_i$, number of stenoses, stenosis severity, and distribution of branch diameters.

27. The computer-implemented method of claim 21, wherein the low-fidelity model is given by either a lumped-parameter model, a 1-D linear model of the Navier-Stokes equations, a 1-D non-linear model of the Navier-Stokes, or a coarse-grid 3-D Navier-Stokes model.

28. The computer-implemented method of claim 27, wherein the low-fidelity model includes a model of pressure drop through each stenosis in the vessel tree.

29. The computer-implemented method of claim 28, wherein the model of pressure drop through the stenosis is obtained via order reduction of 3-D Navier-Stokes equations using assumptions of steady-state, axi-symmetry, and incompressibility, along with variable separation of the axial velocity.

30. The computer-implemented method of claim 28, wherein the model of pressure drop through the stenosis is obtained via a tensor basis reduction for the axial velocity.

31. The computer-implemented method of claim 21, wherein the high-fidelity model is given by either a fine-grid 3-D Navier-Stokes model of pressure and flow, or an invasive FFR assessment for each vessel tree.

32. The computer-implemented method of claim 21, wherein the machine learning method to establish relationships between the low-fidelity and high-fidelity models is a multi-fidelity neural network.

33. The computer-implemented method of claim 32, wherein the multi-fidelity neural network consists of the following components:

an encoder to compress hemodynamic data from the low-fidelity model to low-fidelity feature maps in the latent space;

a decoder to reconstruct the hemodynamic data for the high-fidelity model from high-fidelity feature maps in the latent space;

a fully connected neural network to map the relationship between low-fidelity and high-fidelity feature maps in latent space; and skip connections between encoder and decoder to enhance the relationship between high-fidelity and low-fidelity feature maps.

34. The computer-implemented method of claim 33, wherein the inputs of the fully-connected neural network are:

geometric features of the vessel tree; and the low-fidelity feature maps.

35. The computer-implemented method of claim 33, wherein the outputs of the fully-connected neural network are:

the high-fidelity feature maps.

* * * * *